US010263408B2

(12) United States Patent
Oginski et al.

(10) Patent No.: US 10,263,408 B2
(45) Date of Patent: Apr. 16, 2019

(54) MOVEMENT-TOLERANT WIRING ARRANGEMENT FOR A STAND DEVICE

(71) Applicant: Ondal Medical Systems GmbH, Hünfeld (DE)

(72) Inventors: Stefan Oginski, Fulda (DE); Ronny Bauditz, Suhl (DE); Jonathan Happel, Tann (DE)

(*) Notice: Subject to any disclaimer, the term of this patent is extended or adjusted under 35 U.S.C. 154(b) by 0 days.

(21) Appl. No.: 15/500,468

(22) PCT Filed: Jul. 30, 2015

(86) PCT No.: PCT/EP2015/001571
§ 371 (c)(1),
(2) Date: Jan. 30, 2017

(87) PCT Pub. No.: WO2016/015870
PCT Pub. Date: Feb. 4, 2016

(65) Prior Publication Data
US 2017/0222419 A1 Aug. 3, 2017

(30) Foreign Application Priority Data
Jul. 30, 2014 (EP) .................................... 14002656

(51) Int. Cl.
*H02G 11/02* (2006.01)
*H02G 3/04* (2006.01)
(Continued)

(52) U.S. Cl.
CPC .......... *H02G 11/02* (2013.01); *A61G 12/002* (2013.01); *A61G 13/107* (2013.01); *B65H 75/42* (2013.01);
(Continued)

(58) Field of Classification Search
CPC .... H02G 11/02; H02G 3/0475; A61G 13/107; A61G 12/002; B65H 75/4463;
(Continued)

(56) References Cited

U.S. PATENT DOCUMENTS

| | | | | |
|---|---|---|---|---|
| 1,744,779 A | * | 1/1930 | Massingham | B65H 51/02 226/170 |
| 4,154,324 A | * | 5/1979 | Upton | H02G 11/02 191/12.2 R |

(Continued)

FOREIGN PATENT DOCUMENTS

| | | |
|---|---|---|
| CN | 101688651 A | 3/2010 |
| JP | 9-278293 A | 10/1997 |

(Continued)

*Primary Examiner* — Muhammad Ijaz
(74) *Attorney, Agent, or Firm* — Seed Intellectual Property Law Group LLP

(57) ABSTRACT

A movement-tolerant wiring arrangement for, among other things, a stand device configured for arrangement in an operating room incorporates a mounting apparatus for movement-tolerant mounting of at least one line, for example a cable, about an axis of rotation between two connection components that are displaceable, such as being twistable, relative to one another; and a fastening apparatus for arranging the at least one line relative to one of the connection components, for example at a socket of the stand device; wherein the mounting apparatus is fixable to the fastening apparatus and configured for movement-tolerant, such as, rotation-tolerant guidance of the at least one line about the axis of rotation and/or in the direction at least approximately parallel to the axis of rotation. Furthermore, a rotary joint, a socket or a stand device, respectively, can incorporate such a wiring arrangement, and can use of such a wiring arrangement at a stand device, for example, in the operating room.

15 Claims, 13 Drawing Sheets

(51) Int. Cl.
    *B65H 75/42*     (2006.01)
    *B65H 75/44*     (2006.01)
    *A61G 12/00*     (2006.01)
    *A61G 13/10*     (2006.01)

(52) U.S. Cl.
    CPC ..... *B65H 75/4402* (2013.01); *B65H 75/4463* (2013.01); *H02G 3/0475* (2013.01); *B65H 2701/34* (2013.01); *B65H 2701/3914* (2013.01)

(58) Field of Classification Search
    CPC ................ B65H 75/4402; B65H 75/42; B65H 2701/3914; B65H 2701/34
    USPC ........................ 248/560, 544, 49, 51; 59/78.1
    See application file for complete search history.

(56) References Cited

U.S. PATENT DOCUMENTS

| | | | | |
|---|---|---|---|---|
| 4,284,180 | A * | 8/1981 | Masters | H02G 11/02 191/12.2 R |
| 5,560,391 | A * | 10/1996 | Bantaculo | B65H 75/40 137/355.23 |
| 7,650,743 | B2 * | 1/2010 | Wehler | F16G 13/16 248/49 |
| 9,346,653 | B1 * | 5/2016 | Jawidzik | B65H 75/425 |
| 2008/0225534 | A1 * | 9/2008 | Rus | F16G 13/16 362/404 |
| 2012/0196455 | A1 * | 8/2012 | Fisher | H01R 13/72 439/13 |
| 2015/0086274 | A1 * | 3/2015 | Schwartz | F16L 1/203 405/168.3 |
| 2016/0290438 | A1 * | 10/2016 | Komiya | F16G 13/16 |
| 2017/0023102 | A1 * | 1/2017 | Tetsuka | H02G 3/0475 |
| 2017/0222419 | A1 * | 8/2017 | Oginski | H02G 3/0475 |

FOREIGN PATENT DOCUMENTS

| | | | | |
|---|---|---|---|---|
| NL | | 1030276 C2 | 7/2007 | |
| WO | | 2008/112675 A1 | 9/2008 | |
| WO | WO-2013144819 A1 * | 10/2013 | ................ F16L 1/18 |

* cited by examiner

MOVEMENT-TOLERANT WIRING ARRANGEMENT FOR A STAND DEVICE

BACKGROUND

Technical Field

The present disclosure relates to a movement-tolerant wiring arrangement, in particular, for a stand device configured for arrangement in an operating room, in particular, for displacing the position of a medical device in the operating room, comprising a mounting apparatus for movement-tolerant mounting of at least one line, more particularly a cable, about an axis of rotation between two connection components, that are displaceable, in particular, twistable, relative to one another, and a fastening apparatus for arranging the at least one line relative to one of the connection components, in particular, at a socket of the stand device. In particular, the present disclosure relates to a movement-tolerant wiring arrangement comprising single features of claim 1 and a rotary joint, a socket, or a stand device, respectively with such a wiring arrangement, and the use of such wiring arrangement at a stand device, in particular, in the operating room.

Description of the Related Art

Stands, in particular, ceiling stands, such as for example, ceiling supply units, monitor supports, or so-called spring arms or central axes, usually comprise one or more carriers arranged rigidly or in a way to be adjustable in height, by means of which an attached medical device may be moved and positioned, for example, in an operating room, in particular, also in an intensive care unit. At the stands usually supply units are attached, on which medical devices are arranged, for example, which will be supplied with required media during a surgery, for example. The carriers define a radius of action of the medical device within which the medical device can be positioned in the operating room. The carriers can usually be rotated around at least one rotatable connection, in particular, a rotary joint. The carriers are optionally arranged in a vertically adjustable manner and/or vertically pivotable around an at least approximately aligned horizontal axis.

For such stands a maximum degree of freedom of movement is desired. A greatest possible relative movement, in particular, rotation, of a carrier relative to another carrier can ensure that the medical device may be positioned in a lot of different positions or for a lot of different purposes. Thus, the relative rotational range between two carriers is preferably at least 300° or 330°, and in some cases even at least 420°. The medical device usually provides supply media and also has to be supplied with power, and so within single carriers and/or at the interfaces between said carriers, in particular, within rotary joints, lines or cables must be routed in a way enabling relative rotational movement. In a case, where the stand includes a plurality of carriers mounted on a central axis, the issue arises that a rotational range from the ceiling down to the lowest carrier that may be significantly larger than 300° or 330° has to be handled. The rotational range may be as large as 420° in some variants. For some stands the relative rotational range is adjustable, and so there is a need for a cable management ensuring the operation of the medical device largely independent of a certain rotational position within a large radius of action of the stand.

Stands are known, where lines extending within the stand are covered at the top of the stand by a top cover, for example, a rotationally symmetric rotating canopy, and at the bottom of the stand by a lid provided at a rotary joint, for example, a bottom cover. The rotating canopy may be formed by a spherical cover which may be partitioned into an upper and a lower half, with the upper half attached at a fixed part of the stand and the lower part attached at a turning part. The cover allows for the insertion and passing of lines from below into and through a spindle of the stand, and routing them into the ceiling of the operating room. A line or cable may be arranged in the rotating canopy as well as in the lid such that it is mounted in a movement-tolerant way and does not protrude from the carrier. Thus, the risk of interlocking may be reduced or eliminated. However, for these line coverings a seamless wiring often may not easily be feasible. Usually the coverings may only ensure mounting of a respective line on the carrier or rotary joint which is accessible from below or above. In cases where three or more rotary joints or carriers are provided at a central axis, the issue arises that at least one line/the line at the middle carrier may not easily be covered and mounted in a movement-tolerant way.

In addition, stands are known that include a fastening apparatus at the respective rotary joint where a line, in particular, a cable, may be fastened, to mount the line in a movement-tolerant way around the rotary joint. For example, a helix is attached to the spindle, and a cable protruding from the spindle is inserted into the helix. The cable includes an integrated tension spring which continuously applies tension on the cable. During rotational movement the cable is wound up or unwound according to the rotational movement of the helix, similar to a cable drum. The tension spring ensures that the cable will not slip off the windings of the helix which are open to the outside.

In stands known in the art the cable routing may be difficult. Usually a cable or line has to be arranged on a defined rotary joint and is not guidable in an unrestricted way from one carrier to another. This complicates the supply of the medical device, in particular, for stands with a high degree of freedom of movement, or for stands where the radius of action has to be adjustable in a most flexible way.

BRIEF SUMMARY

It is an object of the present disclosure to provide an apparatus or arrangement for a rotary joint or a socket or a stand, in particular, a ceiling stand, by means of which a mounting or guidance of lines, in particular, cables, about a rotary joint, e.g., between two carrier arms of the stand, may be facilitated. In particular, the object is to provide an arrangement which allows an easy routing of any lines, in particular, independent of the defined number of carrier arms or rotary joints of a stand and/or in a movement-tolerant way relative to the defined amount of a relative rotational angle. It is further an object to provide an apparatus or arrangement by means of which the at least one line may be mounted or routed in a feasible way between two points being displaceable relative to one another without the risk of interlocking or exerting undesired stress.

Said object is solved by a movement-tolerant wiring arrangement, in particular, for a stand device configured for arrangement in the operating room, comprising
    a mounting apparatus for movement-tolerant mounting of at least one line, in particular, a cable, about an axis of rotation between two connection components that are displaceable, in particular, twistable, relative to one another;

a fastening apparatus for arranging the at least one line relative to one of the connection components, in particular, on a socket of the stand device;

wherein the mounting apparatus is fixable to the fastening apparatus and configured for movement-tolerant, more particularly rotation-tolerant, guidance of the at least one line about the axis of rotation and/or in a direction at least approximately parallel to the axis of rotation.

Thus, a complete routing may be performed easily, in particular, independent of the number of rotary joints or carriers, and also independent of a defined degree of freedom of movement or radius of action of the stand device. No slipping clutches, in particular, slip rings, or special conductive materials are required for connection components. In addition, a line, in particular, a cable, may be treated with care. Regardless of a defined rotational position, the line is not unduly subjected to tension or stress, and the line will also not be strongly bent or buckled. When expanding or contracting the mounting apparatus, the bending radius will also change moderately, thus the lines arranged within the mounting apparatus will also be deformed only a little, if at all.

Thus, the disclosure is based on the concept of arranging a line about a defined peripheral angle about an axis of rotation, preferably with several windings to ensure a high degree of movement tolerance. At the same time the respective line may be mounted along a defined path, in particular, without loops or bucklings. Preferably each line is arranged helically about the axis of rotation and remains helically arranged independent of the rotational angle position.

In addition to the advantage that the lines may also be routed via centrally positioned jibs for tripartite or quadripartite central axes, the wiring arrangement also provides the advantage of a perfect adaption to the installation space. However, a rotating canopy requires a comparably large design height (e.g., 200 mm). According to the disclosure the wiring arrangement may be arranged in the socket and thus the design height may be reduced, which is very advantageous for operating rooms with low ceiling heights (about 2.5 m): a greater height for walking through under the stand may be provided. In addition, in contrast to a rotating canopy there is no risk that due to the lack of an explicit guidance too little or too much cable may be routed. The wiring arrangement according to the disclosure defines the routable length of the line(s) which also allows for the mounting by a service technician who is not informed about the specific application of the stand device.

Preferably the mounting apparatus is configured to guide the at least one line from a fastening point or a fastening apparatus starting in an axial direction along the axis of rotation.

In this case "movement-tolerant" denotes preferably an apparatus or arrangement that enables a degree of freedom of movement in at least one direction or around at least one axis. Preferably, the term "movement-tolerant" denotes an arrangement where a relative movement between two fastening points or fastening apparatus which are displaceable relative to one another occurs. A movement-tolerant arrangement may also comprise a rotation-tolerant arrangement.

Thus, a wiring arrangement is preferably an apparatus or arrangement by means of which the at least one line may be mounted and guided along a defined path, in particular, in a way that the line may not interlock with any other lines or components with which the line may come into contact during the relative movement. Preferably, the wiring arrangement is configured to mount and guide a plurality of lines between two fastening points which are displaceable relative to one another. Cables, gas or fluid lines, optical fibers, etc., may be routed as said lines. Preferably at least display cables will be mounted and guided by the wiring arrangement.

A stand device is preferably a device for holding, fixing a position, and/or displacing at least one medical device that for medical purposes may be firmly mounted or positioned on a wall (in a wall bearing), a room ceiling, or also on a floor of an operating room, or any other room, for example, a ceiling stand. The stand device thus may not be moved in a completely unrestricted way in the operating room, but may only be moved within a certain radius of action, in particular, relative to a fastening point or mounting point on a room ceiling or wall of the operating room. The stand device may be configured as a ceiling supply unit mounted on a ceiling, and include one or more supply units mounted adjustably in position on one or two carrier arms. The stand device may also be adapted as a monitor support. The stand device may also be adapted as a so-called spring arm, in particular, one that is mounted on a wall and, for example, includes a light. Thus, a spring arm has a movable mechanics, in particular, one that is adjustable in height, which is capable of supporting a weight at different heights and is manually adjustable by using small operating forces (up to about 50 N). The stand device may also be adapted as a so-called central axis mounted, in particular, on a ceiling and comprising a plurality of carrier systems, each having at least one carrier where a monitor or a light is mounted, for example. The stand device preferably comprises at least two carrier arms, in which an at least one braking device or brake screw is provided, respectively.

A medical device is preferably a supply unit by means of which the means for treating a patient and/or instruments for a surgeon and/or light, clean air, or other media required in the operating room can be provided. The medical device preferably has some kind of control panel and/or some kind of display device, for example, for graphically displaying patient data.

A mounting apparatus preferably is an apparatus by means of which the one or more lines may be enclosed at least in sections along the longitudinal axis of the lines and mounted along a defined path. The mounting apparatus preferably surrounds a cavity to accommodate lines. Preferably the cavity is dimensioned in a way that the mounting apparatus can enclose several lines and forms a kind of "cable duct" to accommodate said lines.

A connection component is preferably a component by means of which single carriers of the stand device may be connected to the mounting device and preferably also to one another. At a stand device that is adapted as so-called central axis, the connection component may be formed as a centrally arranged spindle where several carriers or carrier arms may be mounted.

A fastening apparatus is preferably an apparatus by means of which two components may be attached to a predefined fastening or mounting point in a way, that the relative position of the components being fastened to one another may be defined, at least in the area of the fastening apparatus. In other words: in a mounted state the fastening apparatus is preferably part of a fixed mounting, where two components are coupled to one another. Thus, the fastening apparatus preferably comprises a first coupling for the first component and a second coupling for the second component.

Preferably, a winding is a section of the mounting apparatus that extends around the axis of rotation, in particular, about an arc of at least approximately 360°.

The fastening apparatus may also comprise a fastening portion by means of which the fastening apparatus may be attached to the connection component. The fastening portion is adapted as a plug-in coupling, for example, and includes protruding hooks or projections, which are formed in a geometrically corresponding way to recesses at the connection component or which may engage with corresponding recesses.

Preferably two fastening apparatuses being configured differently are provided, wherein the one fastening apparatus is basically configured in a straight manner (without noticeable or forced curvature) for mounting and guiding of the at least one line, for example, and the other fastening apparatus is configured to mount and guide the at least one line about a curvature or an angle of at least approximately 45° to 120°, preferably 70° to 110°, in particular, 90°. One of the fastening apparatuses may optionally also force the lines to a curved path from a tangential direction in a direction parallel to the jib, for example, with a bending radius of 40 mm.

According to one variant two fastening apparatuses are provided, wherein an upper fastening apparatus connects the upper end of the mounting apparatus to the socket. Through an opening in the socket, the lines may be routed from the jib into the mounting apparatus. The upper fastening apparatus may have the shape of a tube. The lower fastening apparatus is preferably in the shape of a disk. Due to the disk-shape, the lower winding of the mounting apparatus may be guided and mounted. Due to the disk-like structure, grinding or wrapping of the lowest winding with the socket may be prevented.

According to an exemplary embodiment the mounting apparatus extends along a longitudinal axis of the mounting apparatus around the axis of rotation, in particular, with at least one winding, preferably at least 330°. This arrangement is capable of ensuring high movement-tolerance. For example, the wiring arrangement encloses the cavity or a volume having a diameter from 10 cm to 20 cm in a relaxed state. In a mounted state, in particular, in a twisted or expanded state (depending on the direction of the rotational movement about an axis of rotation) the wiring arrangement encloses a volume with a diameter from 5 cm to 30 cm, for example.

According to an exemplary embodiment the mounting apparatus may be fixed at the fastening apparatus by a plug-in connection. This enables an easy assembly and also a variation in the structure of the wiring arrangement.

According to an exemplary embodiment the wiring arrangement is elastically deformable, wherein the mounting apparatus is preferably variable in diameter and/or in a direction at least approximately parallel to the axis of rotation. The mounting apparatus may be formed of elastically deformable material at least section-wise. Preferably, the complete mounting apparatus is made from the same material. Thus, the movement tolerance may be ensured independent of the specific geometric layout of the wiring arrangement.

Preferably, at least one of the at least one windings is elastically contractible and/or expandable, in particular, in the axial and radial direction. This way a line may be mounted in a way enabling variable diameters and also in a variable/movement-tolerant way in an axial direction.

According to a variant the mounting apparatus comprises an elasticity or stiffness that is defined in way to configure the mounting apparatus to support at least one line and to be mounted in a predefined movement area, in particular, between a predefined first axial position and a predefined second axial position and/or between a predefined first radial position and a predefined second radial position. The movement area may, for example, be a cavity with an annular cylindrical volume, in particular, having a radial width in the range of 1 cm to 10 cm, or 2 cm to 5 cm, or 2 cm to 3 cm. The axial height of the wiring arrangement may be freely chosen, and, in particular, may be defined by the number of segments or windings.

The mounting apparatus comprises a radial cross-sectional profile with a diameter in the range of 2 cm to 10 cm or 3 cm to 8 cm, for example. The diameter basically depends on the type and number of lines and also on the diameter of the socket.

According to a variant, the mounting apparatus is pipe-shaped, at least along at least one section. The cross-section of the mounting apparatus or the cross-sectional area enclosed by the mounting apparatus may be round or square, in particular, rectangular. The mounting apparatus may also be formed as a half shell open on top, but it is preferred that the mounting apparatus substantially comprises a completely surrounding cross-section outline. This eliminates the dropping out and/or interlocking of lines. At least in applications where installation space is crucial, a rectangular cross-section may be preferred, as this ensures the best possible usage of the installation space.

According to a variant the mounting apparatus is configured as a kind of linked chain including elements or whirls that are displaceable relative to one another or arrangeable in different angles. The single elements or whirls are preferably movable relative to one another by means of at least one connection portion, wherein the elements/whirls preferably comprise a cross-sectional profile including three side sections. Advantageously the elements/whirls comprise a U-shaped cross-sectional profile including at least one lateral section projecting at one or both free ends of said U-shaped profile in an axial direction.

The mounting apparatus preferably comprises at least in sections an annular, in particular, circular, or rectangular cross-sectional profile. A rectangular cross-sectional profile offers the benefit that single windings may lie on top of each other and support each other in a way that a spacing feature may also be implemented by the windings themselves. In addition, the available volume can be used to the maximum. A substantially plane upper side or lower side of said rectangular cross-sectional profile may also ensure very efficiently that the single windings will not interleave, block or jam one another.

Preferably the mounting apparatus comprises a preferably plane lower side and at least one side face for radially guiding the at least one line. Thus, the mounting apparatus is configured to support the at least one line laterally and to limit the degree of freedom of movement of the line radially.

The mounting apparatus supports, for example, a cavity with a cross-sectional area in the range of 200 $mm^2$ to 700 $mm^2$, in particular, 300 $mm^2$ to 600 $mm^2$, or 350 $mm^2$ to 550 $mm^2$, or about 400 $mm^2$ to about 500 $mm^2$. It has been found that the cross-sectional area in the range of 500 $mm^2$, for example, together with a rotational angle of 360° provides an appropriate amount of freedom of movement, in particular, regarding the installation space available in the socket. In addition, a cross-sectional area in the range of 350 $mm^2$ or 400 $mm^2$ combined with a rotational angle in the range of 420° may be appropriate. These dimensions provide a fine trade-off between the freedom of movement on the one hand and the available space for the at least one line on the other hand. However, the size of the cross-sectional area is preferably not chosen regarding only the rotational angle, but also about the number and size of the lines to be mounted and the diameter of the connection component.

Preferably the mounting apparatus extends helically around at least two windings, in particular, at least 720°, around the axis of rotation, and preferably around three windings.

According to an exemplary embodiment the diameter or curvature radius of the mounting apparatus may be changed within predefined limits. Thus, it may be defined in which area the lines are arranged, independent of the amount of relative rotational movement between the connection components.

According to an exemplary embodiment the mounting apparatus comprises a plurality of windings that are guiding or supporting one another or may be positioned adjacent to one another. Preferably single segments or windings of the mounting apparatus are arranged in an axial direction at least approximately parallel to the axis of rotation successively in series, and are thus arranged on top of each other. Here a segment extends along a peripheral angle of 180°, 270°, or 360°, for example. An upper winding may lie on a lower winding. This ensures that the single segments remain strictly arranged in series. This axial-serial arrangement may be aided by the fact that the mounting apparatus or a respective winding or segment comprises one at least section-wise approximately plane upper surface and/or lower surface. The upper surface and/or lower surface may also include recesses. In order to prevent an interlocking of the windings, the recesses preferably are chamfered or rounded. According to an exemplary embodiment the mounting apparatus comprises a longitudinal slot or access extending along a longitudinal axis, by means of which the at least one line is accessible or may be inserted in the mounting apparatus. More preferably, the longitudinal slot or access extends along the complete length of the mounting apparatus, in particular, on an outer side or an outer lateral surface, thus one line can be inserted or withdrawn radially (from outside), in particular, when the mounting apparatus is already mounted. This also enables a (pre-) mounting of the mounting apparatus without having to install the at least one line in the mounting apparatus first. The longitudinal slot or access may also be formed by two adjacent edges of two halves being plugged into one another.

According to an exemplary embodiment the mounting apparatus includes recesses, in particular, longitudinal recesses, arranged in sections along a longitudinal axis of the mounting apparatus, which preferably extend transverse/orthogonal to the longitudinal axis in a radial direction. By means of the recesses the flexibility, deformability or variability of the mounting apparatus may be configured in a simple way, in particular, section-wise and/or depending on the direction, and also particularly substantially independent of the used material. Preferably, recesses are provided on several surface sections of the mounting apparatus, for example, at an inner side as well as on a bottom side and/or an outer side. Thus, the stiffness, in particular, the bending stiffness, or flexibility of the mounting apparatus may be configured by the dimension of the recesses or by the number of recesses. Here also materials may be used that have a relatively high stiffness, thus, in general flexibility may be configured by the recesses. This is advantageous in cases, for example, where the mounting apparatus comprises a large number of windings or has to be routed a comparatively long way in the direction of the rotational axis.

The recesses advantageously enable an easy configuration of the mounting apparatus as a robust, pluggable modular system, as a relatively stiff material enables resilient engagement connections. In other words: when using a material whose modulus of elasticity is similar to a rigid plastic, such as polyamide, engagement hooks with relatively small dimensions may be formed and provide a lasting secure connection, which also ensures a high security for rotational movements having especially large relative rotational angles.

The recesses may be arranged in a way that the mounting apparatus has a (bending) stiffness or elasticity depending on the direction. In order to ensure high flexibility in a radial direction, as much as possible material has to be omitted on the inner and outer contour. The recesses may have almost any form, depending on the application. The recesses may also be arranged in another way, depending on the application. Preferably, the material is at least discontinued in the area of the inner and outer contour in order to keep the bending stiffness about the axis of rotation low. Preferably, the recesses are arranged in a way that the connection portions or a continuous backbone are positioned as far as possible in the middle. This can ensure that during bending of the mounting apparatus at most only small compressions and extensions of the cable will be caused. The connection portions being relatively rigid in structure may ensure that the complete length of the mounting apparatus is at least approximately constant, independent of the degree of deformation. Radii may be provided at junctions between recesses and connection portions or the supporting backbone to reduce material tensions that may occur during extension and retraction of the mounting apparatus. By using the configuration of the mounting apparatus described above, a greater flexibility in radial direction than in longitudinal direction may also be ensured.

According to a variant the recesses are spaced in at least approximately the same distances relative to one another and their contour is at least approximately identical. Thus, the mounting apparatus may be made of a relatively rigid material whose elastic properties are similar to those of a helically shaped spring, thus the same elastic properties may be ensured for the complete length of the mounting apparatus.

The recesses may also be arranged between single elements of the mounting apparatus. Single elements may be coupled in a way that a relative movement of the elements in relation to one another may occur due to the recesses, in particular, a rotation about an axis of rotation/vertical axis orthogonal to the longitudinal axis, thus the mounting apparatus provides a high variability in diameter.

According to an exemplary embodiment the mounting apparatus is configured as a kind of linked chain, where the mounting apparatus is preferably formed by single elements or whirls that are movable relative to one another by means of connection portions, and where the elements/whirls further preferably include a cross-sectional profile with three side sections, in particular, an U-shaped cross-sectional profile including a lateral section protruding on one or both exposed ends of the U-shaped profile in an axial direction. The structure of the linked chain or whirl chain provides a high flexibility. It allows for the compensation of large relative movements, in particular, for movements through rotational angles considerably larger than 360°. In addition, the mounting apparatus may be twisted seamlessly and without noticeable residual stress, thus an alignment in diameter or length is also ensured for a helical arrangement including windings that are spaced to one another.

The connection portions are thus preferably arranged at the front faces of the elements. The connection portions thus preferably engage with the front faces of the elements. A front face corresponds to a front side or rear side as seen in longitudinal direction.

Preferably, the respective elements are coupled to each other by means of two connection portions that engage with or are arranged at least approximately in the middle on an upper side and lower side of said respective element. Thus, a high variability in the diameter may be ensured, that is, reducing or enlarging the diameter of the mounting apparatus, in particular, without twisting or applying torsion on the mounting apparatus around its longitudinal axis.

According to an exemplary embodiment the mounting apparatus is configured modularly and formed by a plurality of preferably identical segments, wherein one respective segment preferably constitutes one winding. Here each segment may be formed by two segment halves being pluggable into one another. The segments are preferably pluggable into one another. The higher number of segments the greater the degree of freedom of movement.

According to an exemplary embodiment the mounting apparatus comprises at least one segment portion that is mountable in-between, which comprises a coupling part or a coupling portion to which the fastening apparatus or a further segment portion are couplable, in particular, pluggable in a peripheral direction, wherein the segment portion preferably defines an arc of at least approximately 360°, in particular, in a relaxed, not deformed state. The segment portion preferably includes coupling parts/coupling portions at both free ends that are formed identically, respectively, allowing the segment portion to be optionally coupled to a fastening apparatus or a further segment portion. The segment portion may also be denoted as segment. Optionally several segment portions may constitute one segment.

By definition the segment is preferably part of the mounting apparatus that is formed as one piece, and a segment portion is a (preferably pluggable) multi-piece part composed of two segment halves.

According to one exemplary embodiment the mounting apparatus is configured in modules and formed by a plurality of identical segment halves that are coupled, in particular, plugged into one another, to constitute the respective segment on the one hand, and also coupled one after another to constitute the at least one winding on the other hand. Due to a modular design, the wiring arrangement is easy to configure, for example, for a defined relative rotational angle. A segment portion may be enlarged in a simple way, in case a stand device has to support larger or especially large relative rotational angles. This is advantageous for stand devices with an adjustable rotational angle, in particular, and also for stand devices that are displaceable in position, for example, which are required to support a special radius of action depending on the installation site.

According to an exemplary embodiment the mounting apparatus, in particular, at least one segment of the mounting apparatus, is configured as a first lower half and a second upper half, where the halves are couplable to one another, in particular, pluggable in an axial direction. Hereby the axial extension of the segment, that means the height of the segment, may be defined, for example, with a plug connection that is lockable in different positions. In addition, this structure is advantageous regarding a modular concept.

According to an exemplary embodiment the segments halves are formed identically. Segment halves formed identically, in particular, may simplify the assembly, and reduce the cost per article or the manufacturing costs.

According to an exemplary embodiment the segment halves each comprise pins and pin retainers geometrically corresponding to the pins, by means of which the segment halves may be combined to a respective segment, in particular, by at least one form-fitting plug connection. The plug connection may also offer the advantage of mounting without tools or an extension of the mounting apparatus.

The mounting apparatus is preferably formed by an arrangement of (preferably pluggable) single components whose number corresponds to the double number of segment portions, in addition to two fastening apparatuses. In other words: regarding one segment portion, the mounting apparatus consists of at least four single components (in particular, two segment halves and two fastening apparatuses), for two segment portions of six single components, for three segment portions of eight single components, etc. Optionally only one fastening apparatus may be provided, which reduces the number of components by one, respectively.

According to an exemplary embodiment the fastening apparatus is formed by an upper part and a lower part that are preferably adapted as being pluggable into one another.

According to a special variant the mounting apparatus of the wiring arrangement may be adapted as one piece, at least section-wise or in segments as one piece, in particular, regarding one respective winding. This can reduce the assembly effort and in addition ensure a modular structure. Optionally the mounting apparatus may be formed integrally with the fastening apparatus or with one of the fastening apparatuses. For example, the mounting apparatus is formed as one integral injection mold part extending across one or more windings. The integral structure of the mounting apparatus may be advantageous for example, for small rotational movements, small rotary joints, or for relatively light-weight or thin lines. However, the mounting apparatus is preferably composed of a plurality of parts, in particular, to reduce costs, and in order to reduce the complexity of tools.

According to an exemplary embodiment the mounting apparatus is arranged helically or arrangeable helically, in particular, including a plurality of helical windings or segments. A helical arrangement also offers the advantage of arbitrary scalability.

According to an exemplary embodiment the mounting apparatus and the fastening apparatus each include coupling parts that are formed in a geometrically corresponding way relative to one another, wherein the mounting apparatus and the fastening apparatus are couplable to one another in a form-fitting way using the coupling parts, in particular, pluggable in a peripheral direction. A respective coupling part may be formed as an arrangement of engagement hooks, for example, wherein the engagement hooks may engage in a form-fitting way behind undercuts when plugging the coupling parts into each other and fix the coupling parts to each another. The engagement structure may be formed in such a way that the coupling parts cannot perform a rigid body movement relative to one another. At the coupling part, the mounting apparatus may be aligned and supported relative to the fastening apparatus, in particular, independent of the number of windings.

According to a variant the fastening apparatus is configured to fix the mounting apparatus in a predefined direction, in particular, to clamp it. Thus, the fastening apparatus may comprise a passage that is formed in a geometrically corresponding way to an outer surface of the wiring apparatus. Thus, the mounting apparatus may pass through the fastening apparatus and may be aligned by means of the fastening apparatus in a desired (peripheral) direction. The passage of the fastening apparatus may for example, extend in a direction, in which the mounting apparatus extends, in particular, in a tangential direction relative to a spindle of the stand device. This way the mounting apparatus may be aligned with a certain bias in the target direction, thus the line weight may be absorbed and transferred to the fastening apparatus. The fastening apparatus, in particular, the passage, comprises a coupling part that extends about a length of 1 mm to 20 mm, preferably 3 mm to 15 mm, more preferably 5 mm to 10 mm. Such a length provides a good trade-off between a biasing that is applied or aligned in a defined direction and a moderate limitation of elasticity of the mounting apparatus.

According to an exemplary embodiment the mounting apparatus comprises at least one spacer that is configured to ensure a predefined axial distance of at least one winding or one segment relative to one component of the stand device, in particular, a socket of the stand device, or regarding single windings relative to one another. Thus, a predetermined arrangement may be performed in cases, where very many lines or very heavy lines, for example, lines containing fluids, have to be mounted by means of the mounting apparatus. The spacer(s) may also be mounted by using the fastening apparatus in a defined position, for example, by means of any arms or rods extending around the spindle. However, in many applications spacers will not be necessary, for example, in cases, where single segments of the mounting apparatus are configured as self-guiding or lying upon one another, for example, by means of upper and lower surfaces that are at least section-wise plane/even.

The spacer may for example, be configured at an angle having a preferably plane support surface (sliding surface), where a line can abut in a sliding way. The spacer may comprise a fastening element for a line, in particular, a clip or any other form-fitting and/or force-fitting element.

According to a variant the spacer includes an abutment surface for abutment/support of the mounting apparatus, which is mounted displaceably, in particular, radially inwards or outwards, at the spacer. For example, the spacer comprises a carrier that is displaceable in a radial direction, on which the mounting apparatus is radially mountable in a movement-tolerant way. This enables a displacement in a radial direction having almost no friction, in particular, in response to a rotational movement. According to a variant the abutment surface is (also) mounted displaceably in a peripheral direction at the spacer.

According to an exemplary embodiment the spacer may be arranged displaceably in a peripheral direction, in particular, such that it is concentrically rotatable about an axis of rotation, wherein the wiring arrangement preferably includes a displaceable support device (in particular, a sleeve), where the spacer may be attached displaceably in a peripheral direction. Preferably, one or more spacers are fastened to the support device/sleeve. This offers the advantage that the wiring arrangement can be provided as packaged apparatus, independent of any socket or spindle of the stand device. It also enables an upgrade of the wiring arrangement in single rotary joints or upgraded carriers of the stand device.

According to an exemplary embodiment the wiring arrangement comprises a first fastening apparatus (fixing apparatus) by means of which the mounting apparatus may be fixedly positioned at a fastening portion on the other connection component, in particular, at a spindle of the stand device, where the further fastening apparatus is fixed to the mounting apparatus, in particular, by using a plug connection. The further fastening apparatus may be formed as an upper part and a lower part which preferably are formed as being pluggable into another. Optionally, in addition, a screwing may be provided, in particular, to increase a stability or security of the connection.

According to an exemplary embodiment the wiring arrangement comprises an insert by means of which the at least one line may be covered, where the insert is preferably mountable on one of the components of the wiring arrangement, in particular, by using a plug connection. The insert may facilitate the mounting, and guide the lines, in particular, in the area of a spindle passage. The insert may also provide a mounting surface for the mounting apparatus. Preferably the insert may be mounted to the further fastening apparatus in a form-fit way.

According to an exemplary embodiment the wiring arrangement comprises an inlay by means of which the mounting apparatus may be arranged in a defined distance or separate from at least one of the connection components. The inlay is preferably adapted as an integral or multi-part partition component, which may be coupled to at least one of the connection components, in particular, with the socket. The insert as well as the inlay may further extend the wiring arrangement in a way that the mounting apparatus may be mounted in the defined cavity in a movement-tolerant way without the risk of interlocking at edges. According to a variant the further fastening apparatus, the insert and the inlay constitute at least approximately plane boundary surfaces or walls of an (annular) cavity, respectively, wherein the mounting apparatus is mounted in a movement-tolerant way.

According to a variant the wiring arrangement comprises at least two support devices that are nested in one another, where one of the support devices is longer than the other support device(s) in an axial direction. Here the spacers may be mounted in any advantageous vertical positions on the support devices in order to support the mounting apparatus. The mounting apparatus constitutes three windings, for example, where the wiring arrangement comprises at least two or three spacers, wherein each spacer is arranged on a support device around which the windings extend. Here the spacers are arranged, for example, at peripheral angles ranging from 90° to 180° relative to one another.

The wiring arrangement may further comprise a spacer ring on which the at least one/the support device is mounted. By means of the spacer ring the respective vertical position may be adjusted.

According to an exemplary embodiment the wiring arrangement is configured in modules and is formed by an assembly of a plurality of components that are couplable to one another, in particular, pluggable. Preferably, the wiring arrangement is configured as a module which may be pre-assembled in particular, plugged in, without any tools. Preferably, the wiring arrangement includes a plurality of internally pluggable form-fitting interfaces, in addition to two external interfaces by means of which the wiring arrangement may be fastened to the connection components. Preferably, the minimum number of components of the wiring arrangement is specified by the following equation:

Minimum number (N1)=number of segments (nS)+2 interface components or in case of a component structure consisting of two halves, respectively Minimum number (N2)=2×(number of segments (nS))+2×(2 interface components) wherein in addition an insert and at least one inlay/inlay tray may optionally be provided. Thus, an especially flexible wiring arrangement may be configured for special applications.

According to an exemplary embodiment the complete wiring arrangement or at least the mounting apparatus and/or the fastening apparatus is made of a plastic material at least section-wise, in particular, an injectable thermoplastic, in particular, at least also partly of silicone. More preferred is that the wiring arrangement is embodied as polyamide, in particular, due to the reasonable strength properties of polyamide. It is recognized that this kind of material is especially advantageous for the present disclosure, in particular to ensure the desired deformability and also to provide a certain kind of stiffness regarding the heavy weight of lines. Also by using this materials a complex geometric wiring arrangement may be provided in a cost-efficient way.

The object mentioned above will also be solved by a rotary joint or socket for a stand device for arrangement in an operating room, comprising a movement-tolerant wiring arrangement according to the disclosure or by a stand device comprising the rotary joint or socket, respectively, with the movement-tolerant wiring arrangement.

The socket preferably defines at least partly a volume, in particular an annular cavity, for a predefined range of movement of the wiring arrangement. The annular cavity may provide a radial installation space in which relative movements, in particular, changes of diameter of the mounting apparatus, may be performed. Here the mounting apparatus may be arranged at a radial distance in a range of 0 cm to 3 cm from the outer lateral surface of the spindle.

According to an advantageous variant the socket comprises a fastening section adapted as a rib, and, further preferred, including an abutment face or radial face onto which a fastening apparatus may abut.

The object mentioned above may also be solved by a movement-tolerant arrangement comprising a socket and a spindle, where the wiring arrangement is fastened to a first fastening point of the socket and to a second fastening point on the spindle, where each of the fastening points are displaceable in one plane, respectively, which is at least aligned approximately parallel to the other plane, wherein the mounting apparatus is contracting or expanding variably in diameter during relative rotational movement.

The object mentioned above will also be solved by a socket for a stand device for arrangement in an operating room, in particular, for changing the position of a medical engineering device in an operating room, including a movement-tolerant wiring arrangement comprising a mounting apparatus for movement-tolerant mounting of the at least one line, in particular, a cable, around an axis of rotation between two connection components that are displaceable, in particular, twistable, relative to one another; and a first fastening apparatus that is fastened to a fastening portion of the socket at a predefined relative position to fix the position of the mounting apparatus relative to the socket, and a second fastening apparatus that may be arranged at a fastening portion of the spindle at a predefined relative position in an at least non-rotatable manner for fixing the position of the mounting apparatus relative to the spindle; where the mounting apparatus is fixed to the fastening apparatus and is configured to guide the at least one line about the axis of rotation in a rotation-tolerant way, wherein the mounting apparatus may be deformed elastically and is variable in diameter, where the mounting apparatus is configured in modules and is formed by a plurality of preferably identical segments, where the mounting apparatus is positioned helically about the axis of rotation and is arranged displaceably within a cavity (defined range of movement) formed by the socket and at least one of the fastening apparatuses. This offers many of the advantages already mentioned above.

The object mentioned above will also be solved by a stand device for arrangement in an operating room, in particular, also for changing a position of a medical device in the operating room, comprising the movement-tolerant wiring arrangement according to the disclosure, where the stand device comprises a first connection component adapted as a spindle, and a second connection component adapted as a socket, where the spindle and the socket include a fastening coupling or a fastening portion, where the mounting apparatus is fastened both to the spindle and to the socket, and is mounted around the spindle in a way supporting variable diameters. The relative movement of the mounting apparatus in axial and radial direction may be predefined precisely, in particular, regarding a defined (set) rotational angle. A fastening to the socket may be achieved by using screws in a predefined position (fixed mounting). A fastening to the spindle may be preferably achieved by using a rotational lock, for example, which enables an axial displacement, adapted as a tongue and groove connection, for example. This provides advantages regarding different axial positions at the spindle or regarding a plurality of sockets that are to be arranged above one another at the spindle. A tongue and groove joint is advantageous for assembly, as the respective socket is only slid up.

The stand device may thus further comprise: a supporting system comprising a mounting apparatus to fix the position of the stand device in an operating room, in particular, at a ceiling, and at least one carrier arm that may be mounted movable relative to the assembly apparatus in a bearing and/or a joint, in particular, a rotary joint.

The stand device preferably comprises one or more stops or anti-rotational locks to limit rotation. This ensures that the wiring arrangement will not be deformed over a certain threshold value of a maximum relative movement.

According to a variant the wiring arrangement is fastened to the first fastening point of the socket and to the second fastening point on the spindle, where both fastening points are displaceable in one plane, respectively, which is at least aligned approximately parallel with the other plane, where during a relative rotational movement the mounting apparatus is contracting or expanding radially.

According to a variant the radial extension of the cross-sectional profile of the mounting apparatus is larger than half of the predefined movement range, that is larger than half of the movement space of the mounting apparatus in a radial direction. This can ensure that two windings may not lie adjacent to one another, but will always remain arranged above one another and helically. The windings may thus not interlock with each other, but will remain arranged in series in an axial direction.

The spindle may comprise at least one passage for a line, where said passage extends preferably in the axial direction and is arranged on a pitch circle which equals the pitch circle of the mounting apparatus, where the mounting apparatus is not deformed, that means it is neither contracted nor expanded in a radial direction.

According to a variant, the mounting apparatus comprises a free end that is spaced to the passage in a peripheral direction. The mounting apparatus is then fastened only by means of one end and by using only one fastening apparatus. This allows for a relative movement of the mounting apparatus without subsequent displacement of the line within the passage. Thus, friction of the line within the passage may be eliminated. Preferably, the distance in a peripheral direction of an arc equals an extension about 10° to 90°, preferably 20° to 60°, and more preferably 30° to 45°. Such a distance is a good trade-off between a movement tolerance and a defined arrangement of the line, in particular, with a small footprint.

The object mentioned above will also be solved by using a movement-tolerant wiring arrangement at a stand device configured for arrangement in an operating room, in particular, to change a position of a medical device, in particular, a movement-tolerant wiring arrangement according to the disclosure, where at least one line in the mounting apparatus of the wiring arrangement is mounted in a movement-tolerant way and in a way supporting variable diameters between two fastening points that are displaceable relative to one another and guided around an axis of rotation in the socket, where the wiring arrangement is fastened to the socket by means of a fastening apparatus.

BRIEF DESCRIPTION OF THE SEVERAL VIEWS OF THE DRAWINGS

The disclosure will be explained in greater detail in the following figures with the help of exemplary embodiments. Here the variants shown in the exemplary embodiments may be combined, for example, the displayed rib of the socket or the hook at the fastening apparatus. Illustrated are.

DESCRIPTION OF THE RELATED ART

When describing the following figures, for reference numbers that are not explicitly explained in a figure, reference is made to the other figures.

Figure 1A:
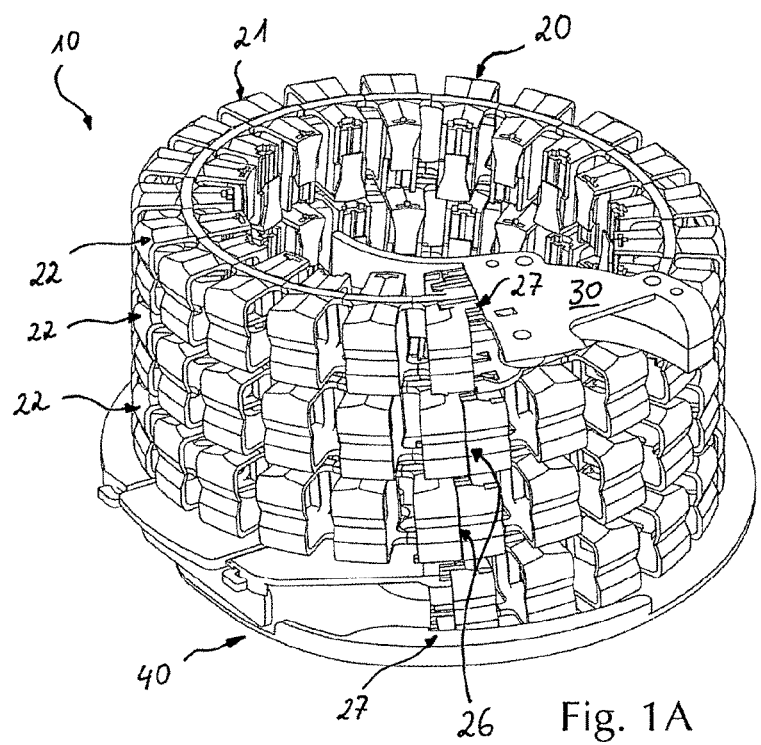
In FIGS. 1A, 1B, and 1C different views of a movement-tolerant wiring arrangement according to an exemplary embodiment of the disclosure.
Figure 1B:
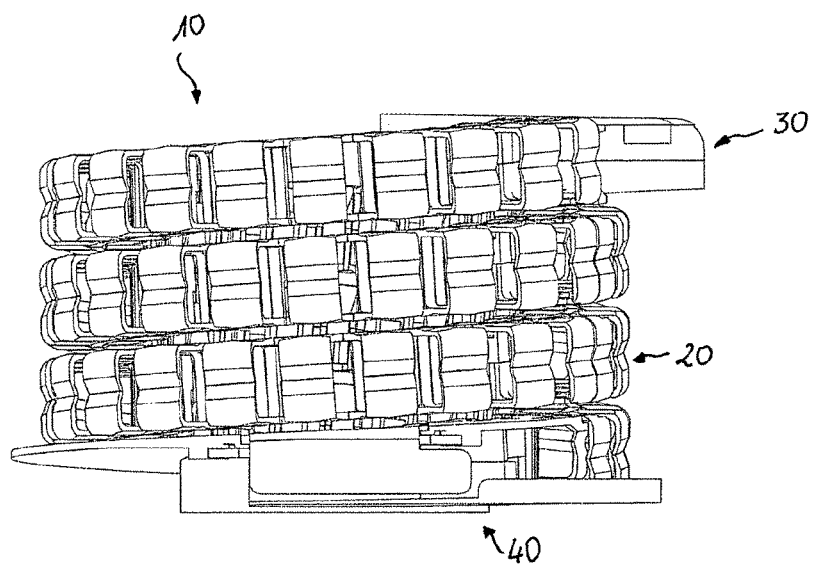
Figure 1C:
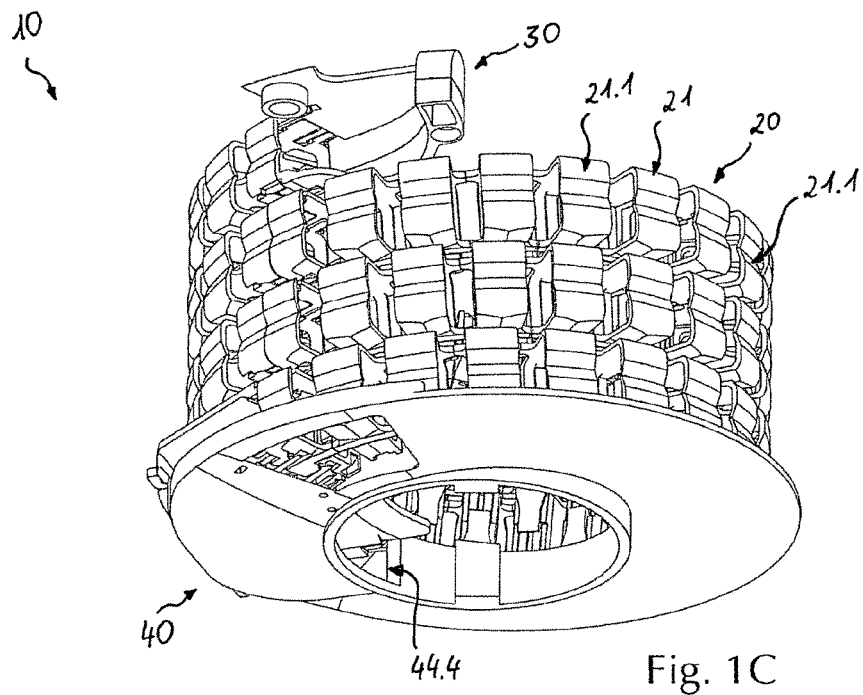

FIGS. 1A, 1B, and 1C show a movement-tolerant wiring arrangement 10 including a mounting apparatus 20 comprising three segments 21 or segment portions 22 mounted in between. The segments 21 are respectively plugged into one another in the coupling portions 26. The mounting apparatus 20 is connected at both free ends with a fastening apparatus by using coupling parts 27, respectively. The respective segment 21 comprises an access or longitudinal slot 21.1 at a radially external side portion.

Figure 2A:
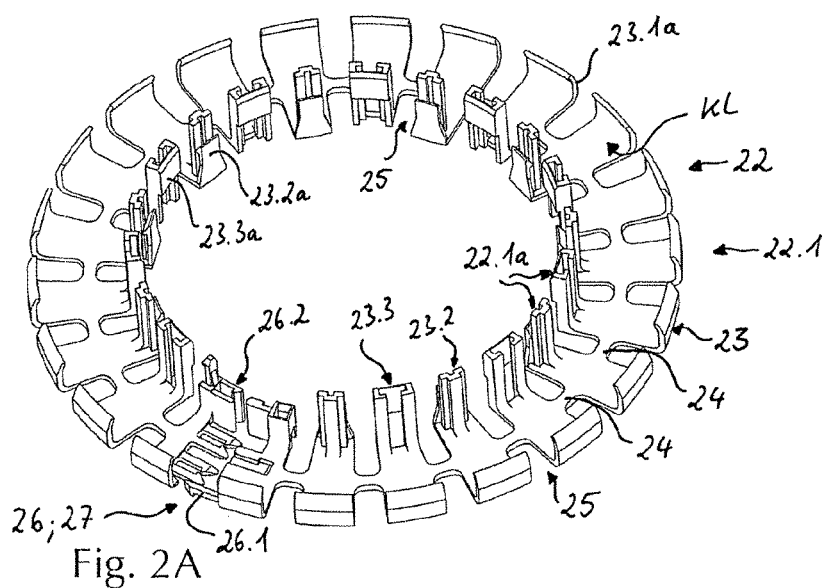
In FIGS. 2A, 2B, 2C, and 2D a segment of a movement-tolerant wiring arrangement in different views according to an exemplary embodiment of the disclosure.

In FIGS. 2A, 2B, 2C, and 2D details of the respective segment portions 22 are shown. The segment portion 22 is formed of two halves, from which a lower half 22.1 is shown in FIG. 2A. Each half consists of a plurality of whirls or elements 23, which are linked to each other and are movable relative to one another by means of link sections 24. Preferably elements/whirls 23 have a cross-sectional profile having three side portions 23.1. Here the half 22.1 is formed integrally. Advantageously the elements/whirls 22 comprise an U-shaped cross-sectional profile including at least one lateral portion 23.1a axially protruding on at least one or both free ends of the U-shaped profile. The connection portions 24 are arranged approximately in the middle relative to a radial extension of the respective elements. The connection portions 24 are elastically deformable. To this end the connection portions 24 may be formed of a material with an especially high flexibility, and/or only a small width so that even relatively stiff materials are elastically deformable. A respective connection portion 24 is preferably formed by a small fillet that is made of the same material as further portions of the segment portion 22. Two adjacent elements 23 are connected by using two fillets/connection portions 24, respectively, in particular, at an upper side and at a lower side of segment 21. This can ensure that the segment 21R or the fastening apparatus 20 will not be twisted or bent by torsion. The connection portions 24 are arranged along a common longitudinal axis and constitute a kind of continuous backbone, this is a kind of backbone that is comparably stiff in structure, of the mounting apparatus 20. However, at an outer side or inner side no fillets are provided to allow for a maximum movement tolerance. In other words, each element 23 is arranged approximately parallel to the axis of rotation in a pivotable way.

At the inside and outside of the connection portions 24 recesses 25 are formed. The dimensions of the recesses 25 may define the amount of movement allowed. The recesses 25 ensure that the elements 23 allow for a high degree of freedom of movement relative to one another. Thus, the elements 23 may be arranged relative to one another about an axis of rotation in a way resulting in an optionally smaller or larger curvature radius of the segment 21. Each element 23 comprises three side portions 23.1 which enclose a line duct KL and extend at least approximately in a plane, respectively, with one of the side portions being a lateral section 23.1a arranged radially on the outside, limiting the line duct KL radially on the outside.

FIG. 2a shows that the halves 22.1, 22.2 comprise a coupling portion 22.1a, 22.2a, respectively, where the other half 22.1, 22.2 is connectable with the half 22.1, 22.2. The coupling portions 22.1a, 22.2a are thus formed by a single element 23, that is, by pins 23.2 on the one hand, and by pin retainers 23.3 on the other hand, each comprising engagement means 23.2a, 23.3a, respectively. The coupling portions 22.1a, 22.2a are provided at an inner side of the mounting apparatus 20. The pins 23.2 and pin retainers 23.3 are alternately arranged in series at the periphery. Thus, a resilient, robust plug connection may be provided by means of the coupling portion 22.1a. The respective halves 22.1, 22.2 may also be configured as identical parts.

In FIG. 2a is further shown that the half 22.1 comprises a coupling portion 26 at both free ends. A first coupling portion 26.1 is formed at the first free end, and a second coupling portion 26.2 is formed at the second free end. Both couplings portions 26.1, 26.2 are formed complementary to one other or in a geometrically corresponding way, so that the first coupling portion 26.1 of a first segment portion 22 may be plugged into a second coupling portion 26.2 of a second segment portion 22.2. Adjacent to the first coupling portion 26.1 a pin 23.2 is arranged, and a pin retainer 23.3 is arranged adjacent to the second coupling portion 26.2. In this configuration the halves 21.1, 22.2 can be used easily as identical parts for a modular configuration of the fastening apparatus 20. The respective coupling portion 26 may alternatively form a coupling part 27 to connect to the fastening apparatus.

Figure 2B:
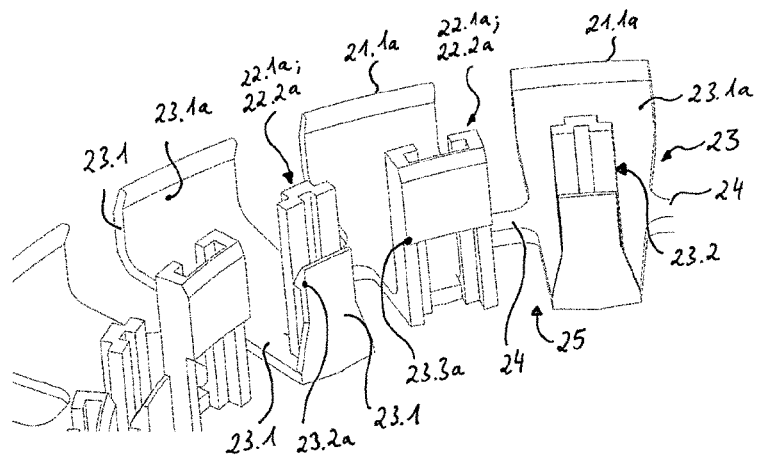

In FIG. 2B the structure of one single element 23 of one of the halves 22.1, 22.2 is shown in detail. The coupling portions 22.1a, 22.2a are formed by pins 23.2 having a T-shaped cross-sectional profile and pin retainers 23.3 each including a retainer cavity with a respective geometrically corresponding cross-sectional profile. The pins 23.2 and pin retainers 23.3 are arranged at the inner side portion 23.1, respectively. The pins 23.2 comprise engagement means 23.2a being adapted as engagement hooks, respectively, which may be elastically biased, and the pin retainers 23.3 comprise engagement means 23.3a being adapted as steps or undercuts, respectively, provided in a geometrically corresponding way to the engagement hooks. An abutment edge 21.1a at the lateral portion 23.1a allows for the isolation of an access or longitudinal slot formed between two halves.

Figure 2C:
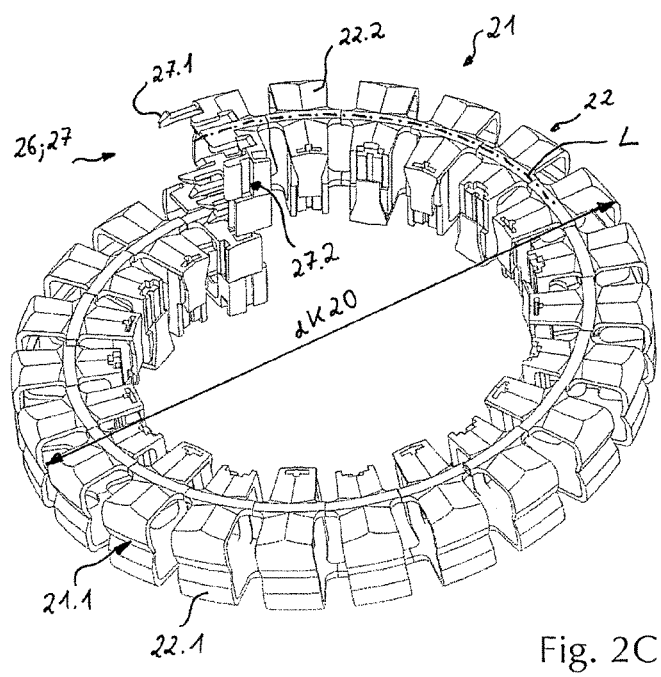

FIG. 2C shows how the two halves 22.1, 22.2 are pluggable into one another. The shown segment 21 of the mounting apparatus 20 extends along a longitudinal axis L and is arranged helically. The mounting apparatus or respective segment 21 has an (outer) diameter dk20 that is variable and may be at least as large as the diameter of an annular cavity within which a relative movement of the mounting apparatus may be/is to be performed. The coupling part 27 provided on at least one free end of the segment portion 22 comprises first engagement means 27.1 adapted as engagement hooks which may be elastically biased, as well as second engagement means 27.2 adapted as steps or undercuts that are configured in a geometrically corresponding way to the respective engagement hooks.

Figure 2D:
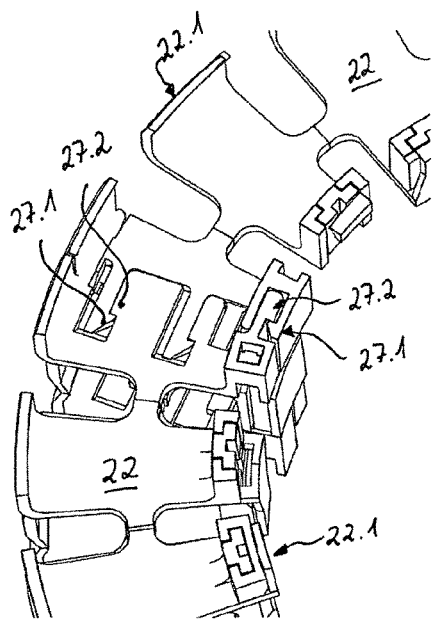

FIG. 2D shows how the halves 22.1 of adjacent segment portions are pluggable into one another.

Figure 3:
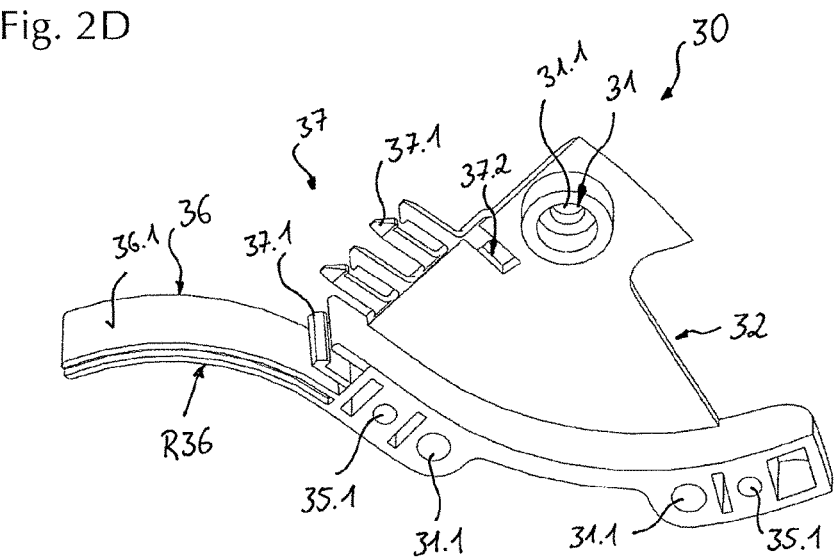
In FIG. 3 in a perspective bottom view an upper part of a fastening apparatus of a movement-tolerant wiring arrangement according to an exemplary embodiment of the disclosure.

FIG. 3 shows an upper part 32 of the fastening apparatus 30 that is attachable to one of the connection components (not shown), in particular, to the socket (see FIG. 9A) by using a fastening section 31 comprising fastening means 31.1, in particular, through-bores. For example, screws can be used to screw the fastening apparatus 30 to the socket.

The upper part 32 comprises a latch 36 protruding in a peripheral direction that includes an abutment surface 36.1 that is curved inwards in the direction of the rotational axis. The mounting apparatus 20 may abut abutment surface 36.1, in particular, at one of the inner side portions 23.1 of the segment 21 mounted to the fastening apparatus 30. The latch 36 includes a curvature radius R36 that defines a minimum curvature radius of the mounting apparatus 20. This ensures that no excessive stress is applied on the plug connection between the mounting apparatus 20 and the fastening apparatus 30 and that the mounting apparatus 20 will be bent only to a certain degree. The upper part 32 and the lower part 34 shown in FIG. 4 constitute the fastening apparatus 30.

Figure 4:
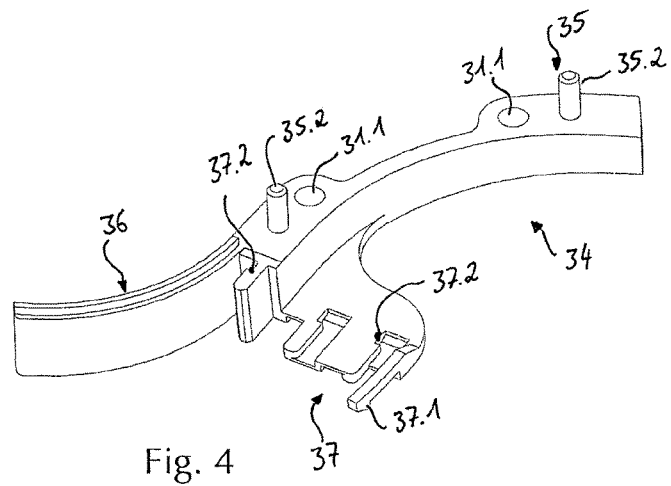
In FIG. 4 in a perspective top view a lower part of the fastening apparatus.

FIG. 4 shows a lower part 34 of the fastening apparatus that constitutes the latch 36 together with the upper part 32. The upper part 32 and the lower part 34 are pluggable into one another by means of a plug connection 35 comprising pin recesses 35.1 at the upper part 32 and pins 35.2 at the lower part 34.

FIGS. 3 and 4 show that the coupling part 37 comprises first engagement means 37.1 adapted as engagement hooks that may be elastically biased, as well as second engagement means 37.2 adapted as steps or undercuts that are formed in a geometrically corresponding way to the respective engagement hooks and steps in the segment portions.

Figure 5:
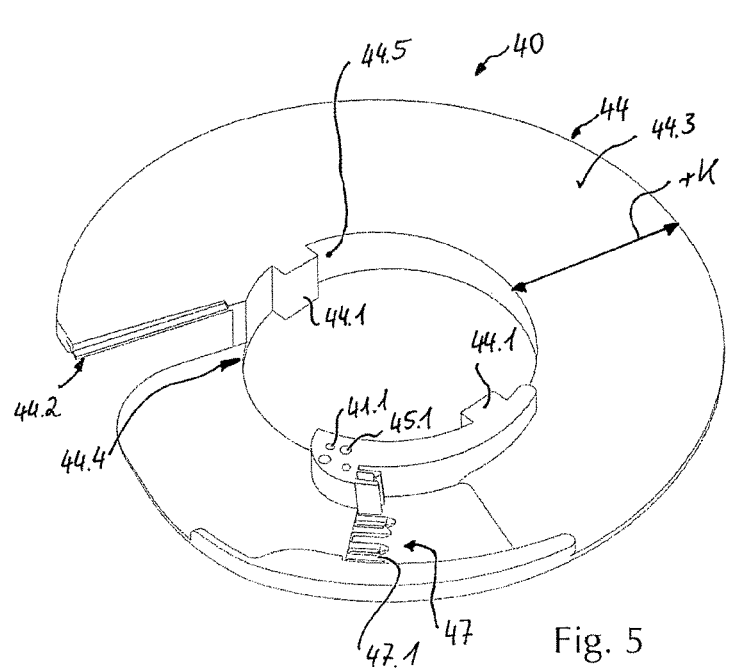
In FIG. 5 in a perspective top view a lower part of a further fastening apparatus (fixing apparatus) of a movement-tolerant wiring arrangement according to an exemplary embodiment of the disclosure.
Figure 9A:
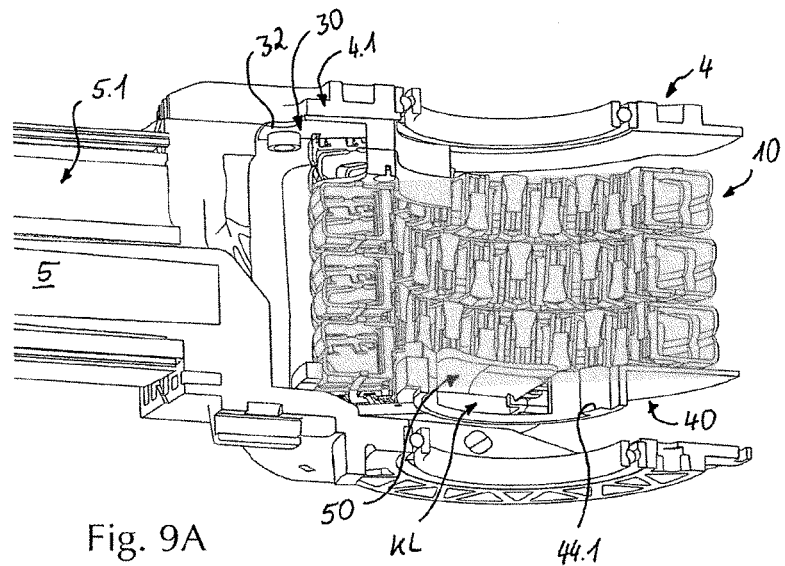
In FIG. 9A, 9B in different perspectives cross-sectional views a movement-tolerant wiring arrangement according to an exemplary embodiment of the disclosure in a mounted state.

FIG. 5 shows a further fastening apparatus 40 adapted for mounting in a rotationally locked way to the further connection component (not shown), in particular, at the spindle (see FIG. 9A). The further fastening apparatus 40 can provide a junction with a predefined curvature radius between the mounting apparatus 20 and the spindle. The rotational lock configuration/arrangement may be ensured by means of taps and springs 44.1 that engage with a corresponding groove at the connection component. As opposed to the fastening apparatus 30, it is not intended to fasten the connection component in a predefined relative position. The fastening apparatus 40 comprises a lower part 44 and an upper part 42 (see FIG. 6). The lower part 44 is formed as helical annular disk and expands about at least approximately 360°, which equals one winding. The lower part 44 comprises a support surface 44.3, on which the segment may rest. The support surface 44.3 extends in a radial direction over a width rK that is larger than the radial width of the mounting apparatus 20. The width rK defines the dimension of an annular cavity, within which the mounting apparatus 20 is able to perform a relative movement in a radial direction. The support surface 44.3 preferably forms a sliding pair with the mounting apparatus 20 or at least comprises a low friction coefficient or is adapted as a sliding support surface. The support surface 44.3 may, for example, be made of polyamide.

The lower part 44 includes a passage 44.4 extending radially inwards that passes through a wall 44.5. The passage 44.4 is a recess formed in wall 44.5. Lines can be routed through the passage 44.4 to a spindle.

Figure 6:
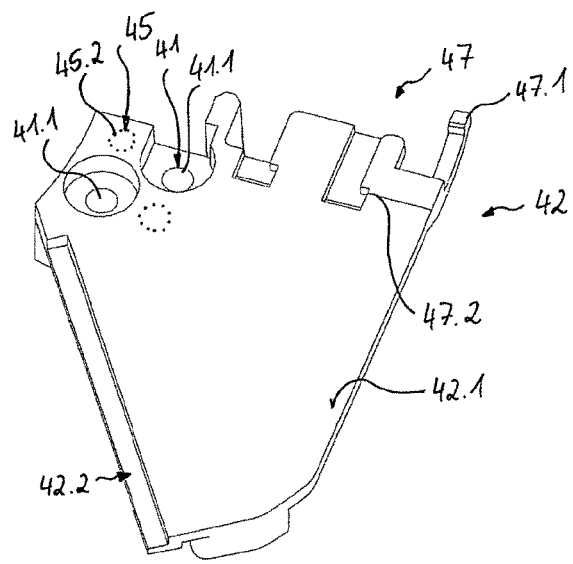
In FIG. 6 in a perspective top view an upper part of the fastening apparatus.

FIG. 6 shows the upper part of the first fastening apparatus 40 that forms an interface (coupling part 47) to the mounting apparatus 20 together with the lower part 44. The upper part 42 and the lower part 44 are pluggable into one another by means of a plug connection 45 comprising pin retainers 45.1 at the lower part 44 and pins 45.2 (shown as dashed lines) at the upper part 42. The upper part 42 includes a plane upper surface 42.1 where a segment may rest upon. The upper side 42.1 is arrangeable at least approximately in the same plane as the support surface 44.3. The upper part 42 includes a leading-edge 42.2, 44.2 like the lower part 44, by means of which an insert 50 (see FIG. 7) may be coupled to the fastening apparatus 40.

The upper part 42 and the lower part 44 may be plugged into another by means of a plug connection 45 comprising pin retainers 45.1 at the upper part 42 and pins 45.2 at the lower part 44. In addition, the position of the parts 42, 44 relative to one another may be fixed, in particular, by using screws, by means of a securing portion 41 including securing means 41.1, in particular, (threaded) through-bores.

FIGS. 5 and 6 show that the coupling part 47 comprises first engagement means 47.1 adapted as engagement hooks, which may be elastically biased, as well as second engagement means 47.2 adapted as steps or undercuts that are formed in a geometrically corresponding way to the respective engagement hooks and steps in the segment portions.

Figure 7:
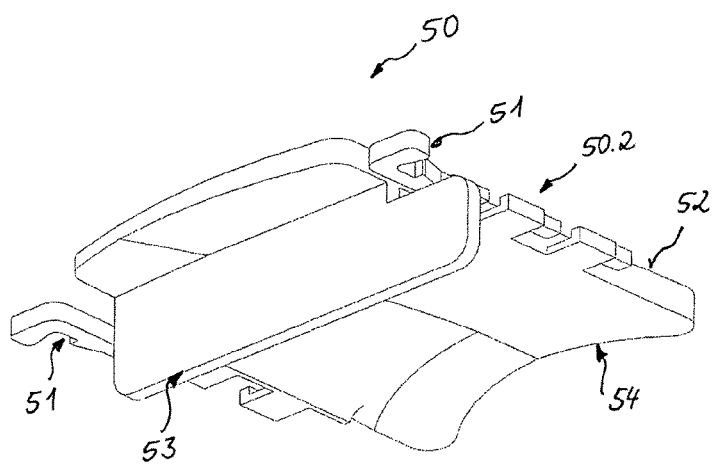
In FIG. 7 in a perspective bottom view an inlay configured to connect with the fastening apparatus.

FIG. 7 shows an insert 50 adapted as cover or lid for covering routed lines. The insert 50 comprises two guiding profiles 50.2 adapted in a geometrically corresponding way to the leading edges 42.2, 44.2. The insert 50 comprises a plane upper side 52 which lies at least approximately in the same plane as the support surface 44.3 or the upper side 42.1. In addition, the insert 50 includes engagement hooks 51 that are adapted to fix the insert 50 to the mounting apparatus 40, and which are adapted in a geometrically corresponding way to the respective engagement means of the mounting apparatus 40. The insert 50 further includes a radial partition 53 that is arranged radially outside, by means of which a line duct KL being formed by the fastening apparatus 40 may be isolated. The insert 50 is preferably mounted after the routing of lines. Due to the insert 50 the further fastening apparatus 40 or the mounting apparatus 20 remain easily accessible. The insert 50 includes a bracket 54 protruding radially inwards that may engage with the passage of the spindle and guide the line(s) through the passage, for example, in particular, without the risk of damaging the lines in the passage.

In many applications the lines are routed preferably upwards within the spindle, in particular, for ceiling stands. The bracket 54 may thus create a security space between the line portions routed in the spindle and further windings of the mounting apparatus. On the bracket an elevation may be provided/formed that has the external radius of the spindle and thus replicates the shape of the spindle. Thereby an interlocking of the mounting apparatus at the passage or the spindle window 3.2 can be prevented.

Figure 8A:
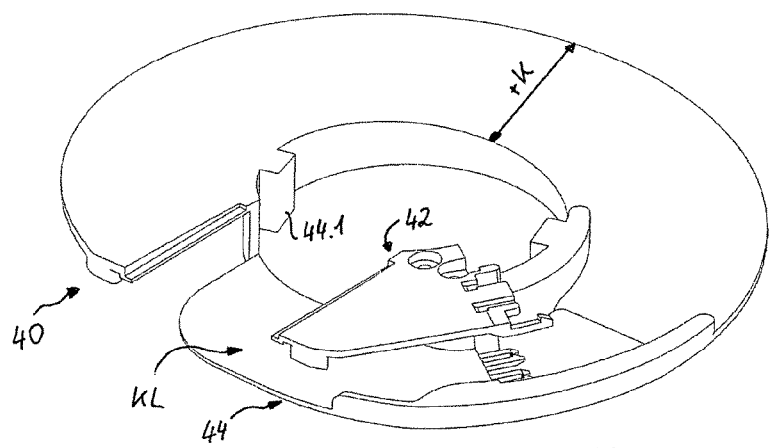
In FIG. 8A, 8B in different perspective views the fastening apparatus with and without insert.
Figure 8B:
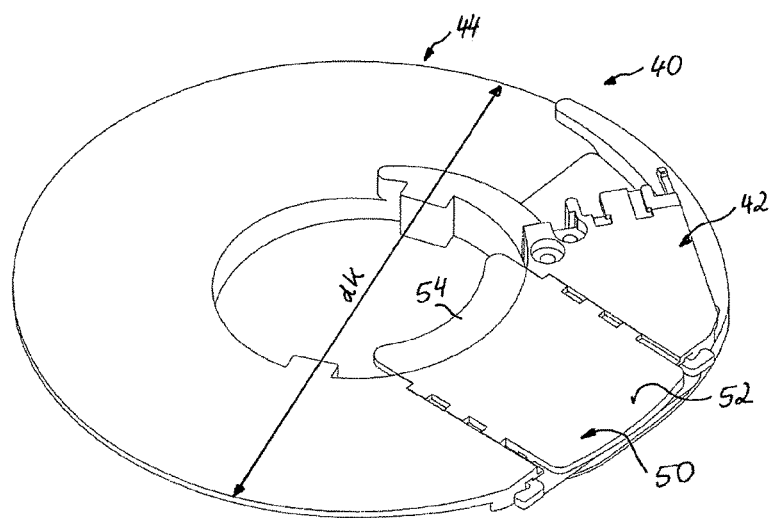

FIGS. 8A and 8B show the further fastening apparatus 40 in an assembled state including the insert 50. To enable a simple exchange of systems components, the disc-like fastening apparatus 40 is formed of multiple parts. Together with the insert 50, the fastening apparatus 40 may form a line duct KL to define a routing path of line(s), as can be seen in FIG. 9A. The fastening apparatus 40 comprises a diameter dK defining a diameter of the annular cavity K (see FIG. 11), within which the mounting apparatus may/is to perform a relative movement. The inner radius of the line duct KL may be about 50 mm, for example, the outer radius about 40 mm, for example, and a deflection angle about 90°, for example.

FIG. 9A shows a connection component adapted as a socket 4, where the fastening apparatus 30 of the wiring arrangement 10 is fastened in a fastening portion 4.1. The socket 4 is rotatably mounted to a hollow spindle 3, shown in FIG. 9B, that defines an axis of rotation D. Here the socket 4 is part of a rotary joint 7 or forms said rotary joint 7, in particular, together with the spindle 3. To this end the socket 4 may include at least one bearing, for example, a ball bearing. The socket 4 is connected with a carrier arm 5 in a non-rotatable manner. The fastening apparatus 30 includes a cable duct 5.1 of the carrier arm, in which one or more lines may be routed. In a lower area of the wiring arrangement 10 the line duct KL that is formed by the further fastening apparatus 40 is displayed.

Figure 9B:
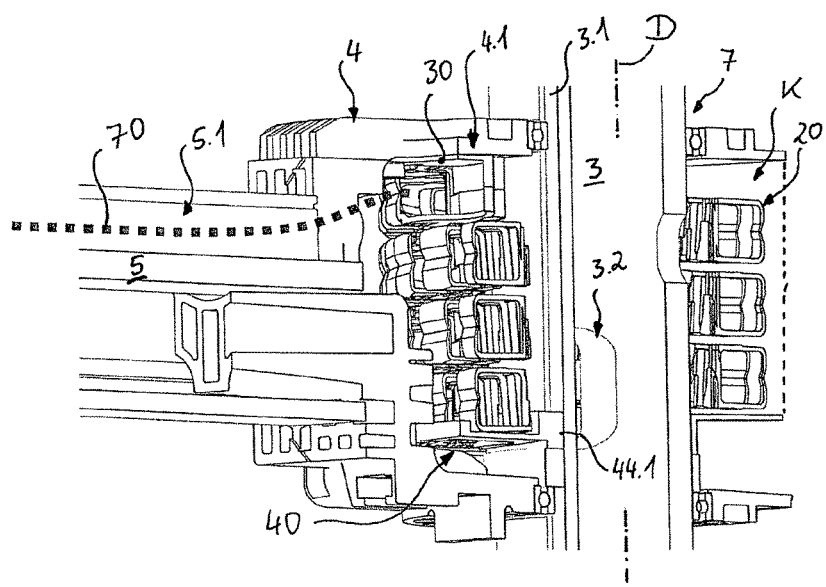

In FIG. 9B a line 70 is indicated that is routed in the cable duct 5.1 and guided through the fastening apparatus 30 to the mounting apparatus 20. Thus, the lines from a lower end of the mounting apparatus, that means starting at the further fastening apparatus 40, may be routed through a passage 3.2 and within the spindle 3 upwards or downwards, in particular, to a ceiling flange. As described above, the fastening apparatus 30 is fastened to the socket 4 and the spindle 3 in a rotationally locked manner by spring(s) 44.1 engaging with groove(s) 3.1. When the carrier arm 5 is pivoted relative to the spindle 3, the rotational position of the fastening portion 4.1 is displaced relative to the further fastening apparatus 40. Here the mounting apparatus 20 will be compressed or expanded, and thus its curvature radius is enlarged or reduced. The mounting apparatus 20 expands itself radially or contracts itself radially. For this end, the mounting apparatus has a predefined movement area K, in particular, an annular cavity formed between the external lateral surface of the spindle 3 and an interior lateral surface of the socket 4 or an insert (see FIG. 10A, 10B).

Figure 10A:
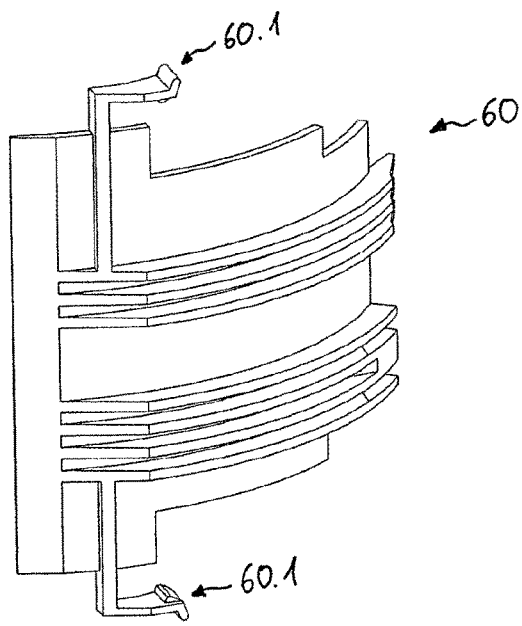
In FIG. 10A, 10B in different views an inlay tray of a movement-tolerant wiring arrangement, respectively, according to an exemplary embodiment of the disclosure.
Figure 10B:
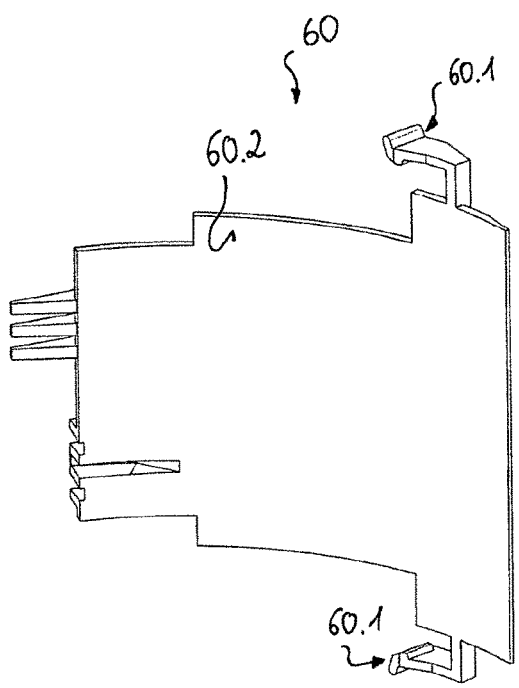

FIG. 10A, 10B show an insert 60 adapted as tray or radial partition that is arrangeable between an inner side of the socket and the mounting apparatus. The height of the insert 60 equals at least approximately the height of the socket. Engagement hooks 61 are arranged on the upper side and lower side of the insert 60 which are configured to attach the insert to the socket in a form-fitting and/or force-fitting way (see FIG. 11). The insert 60 includes a planar inner surface 60.2 where a radial outer side of the mounting apparatus may abut. This ensures that the mounting apparatus will not interlock with any steps or protrusions of the socket, regardless of the configuration of the socket. Instead the mounting apparatus may be guided at the inner surface 60.2 in an almost frictionless way. The inner surface 60.2 encloses the annular cavity K section-wise radially on the outside.

Figure 11:
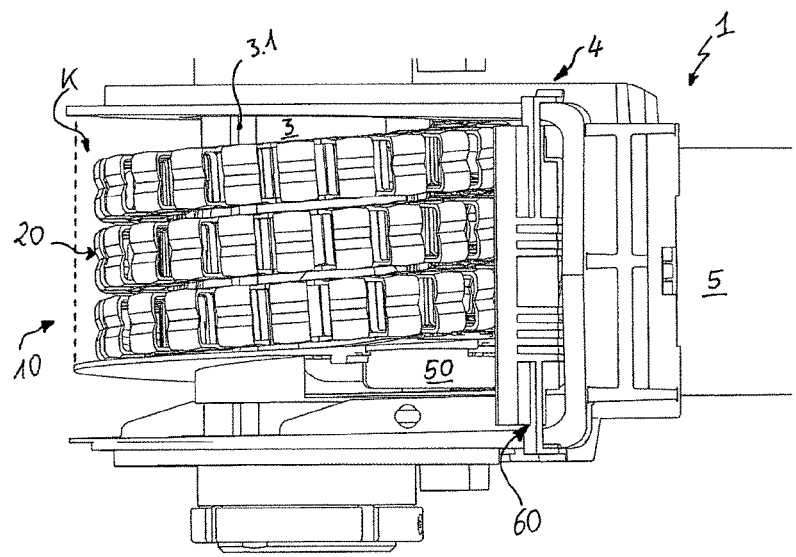
In FIG. 11 in different side views a movement-tolerant wiring arrangement according to an exemplary embodiment of the disclosure in a mounted state including an insert.

FIG. 11 shows the wiring arrangement 10 in a finally mounted state, wherein the lines guided by the wiring arrangement 10 are not shown.

The wiring arrangement 10 described above enables the simple routing of lines and an adequate arrangement of lines about an axis of rotation in a way that a relative rotation of two connection components may be performed without the risk of jamming or interlocking the lines, in particular, also with large relative rotational angles of more than 360°. The mounting apparatus 20 of the wiring arrangement 10 is thus displaceable in a radial direction in an annular cavity and variable in its curvature radius, that means expandable/enlargeable or reduceable.

Figure 12:
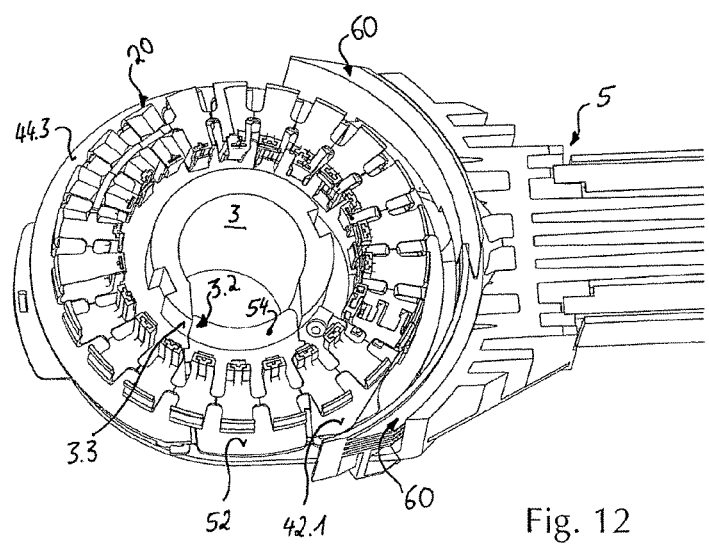
In FIG. 12 in a perspective plan view the arrangement shown in FIG. 11.

FIG. 12 shows that between the inlay 60 or single inlay trays and an external lateral surface 3.3 of the spindle 3 an annular cavity K is defined that is bounded by the support surface 42.1, 44.3; 52 of the lower fastening apparatus 40 or insert in the lower direction. On the one hand, the mounting apparatus 20 is capable to perform a sliding relative movement in a radial direction and a peripheral direction on the support surface 42.1, 44.3; 52 relative to the support surface 42.1, 44.2; 52, and on the other hand, a sliding relative movement in axial direction and peripheral direction along the inner surface 60.2 of the inlay.

A line may be routed/guided starting at the carrier arm 5 through the mounting apparatus 20 and be guided in the area of the first (lower) fastening apparatus inwards through the passage 3.2 into the cylindrical cavity of the hollow spindle 3, wherein the radially inward protruding racket 54 may prevent a chafing with the edges of the passage 3.2.

Figure 13:
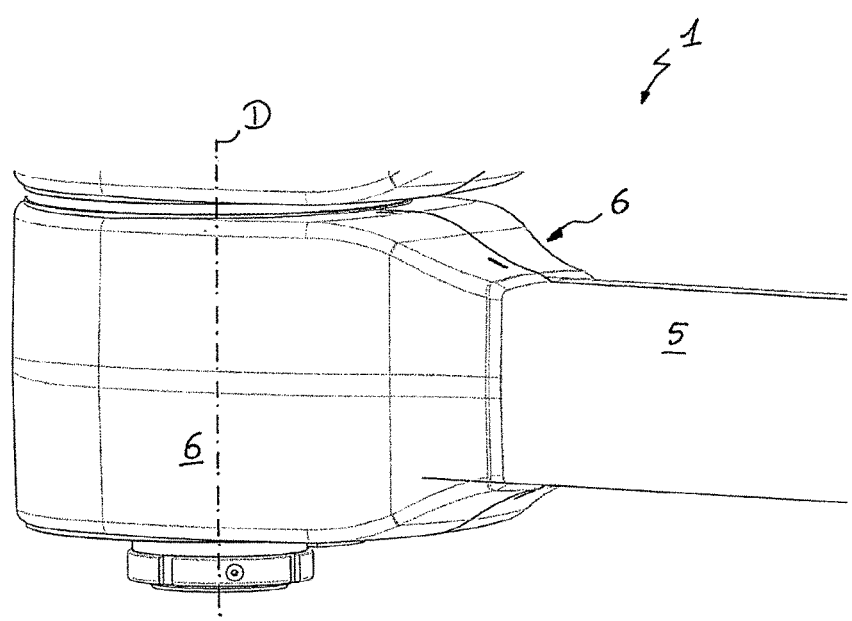
In FIG. 13 in a perspective side view one part of the stand device including a completely integrated movement-tolerant wiring arrangement according to an exemplary embodiment of the disclosure.

FIG. 13 shows that due to the wiring arrangement 10 described above a cladding 6 of a stand device 1 or carrier arm 5 may be provided in a way that no lines are visible or may jammed. The wiring arrangement 10 may be enclosed completely by the cladding 6 and thus may be integrated in a carrier arm 5 or a rotary joint between two carrier arms.

Figure 14:
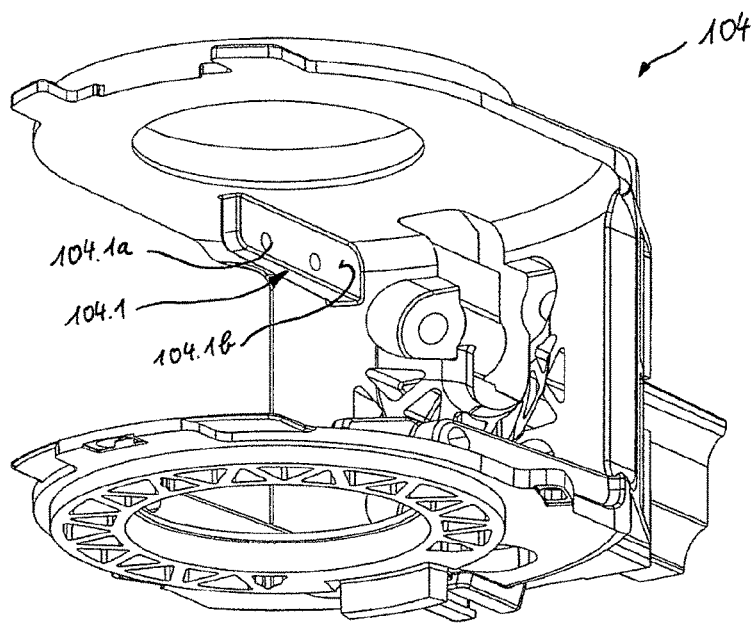
In FIG. 14 in a perspective view a socket for a movement-tolerant wiring arrangement according to an exemplary embodiment of the disclosure.

FIG. 14 shows a socket 104 that includes a fastening portion 104.1 adapted as a rib. The rib protrudes axially from a plane lower side of the upper annular portion of the socket 104. The rib 104.1 extends at least approximately radially or parallel to a radial direction, depending on the preferred position of the rib. The rib includes at least one bore or at least one opening 104.1a, where a fastening apparatus of a wiring arrangement according to the disclosure may be fastened. In addition, the rib comprises an abutting face 104.1b formed in a geometrically corresponding way to the respective abutment face of the fastening apparatus. Preferably, the abutting face extends at least approximately in a radial direction or parallel to a radial direction. The abutting face may also be described as radial flank.

The rib 104.1 enables or facilitates a (de)assembly of the wiring arrangement even in cases where the stand device has already been assembled or has been at least partly put in operation.

Figure 15:
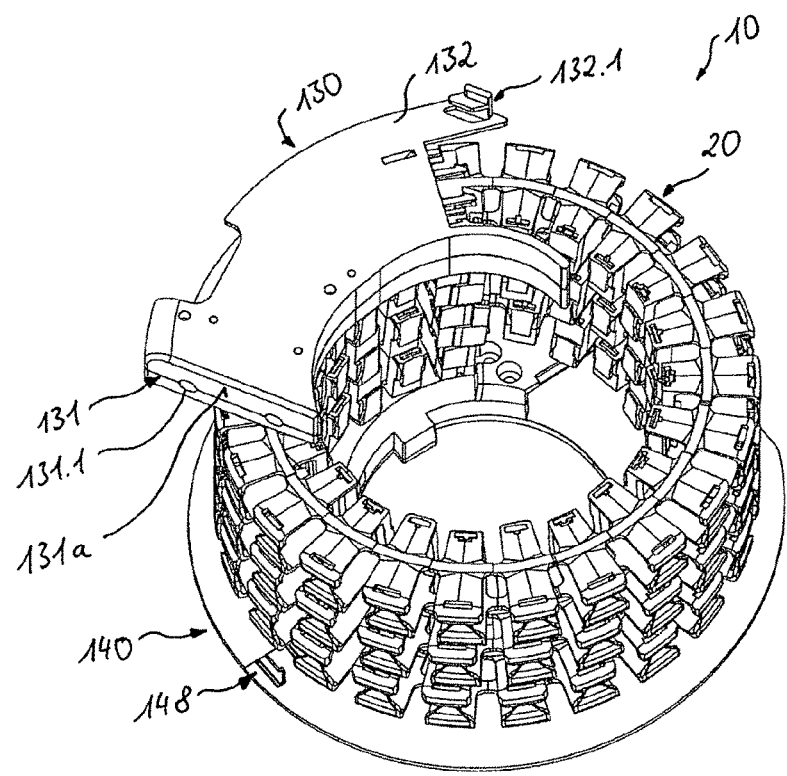
In FIG. 15 in a perspective plan view a fastening apparatus, a mounting apparatus and a further fastening apparatus of a movement-tolerant wiring arrangement according to an exemplary embodiment of the disclosure; and In FIG. 16 in a perspective view a further fastening apparatus for a movement-tolerant wiring arrangement according to an exemplary embodiment of the disclosure.

FIG. 15 shows the wiring arrangement 10 according to the disclosure including the components mounting apparatus 20, fastening apparatus 130, and further mounting apparatus 140. The mounting apparatus 130 includes a fastening portion 131 including an abutting face 131a and fastening means, in particular, bores 131.1. The abutting face 131a is formed in a geometrically corresponding way to the respective abutting face 104.1b of the socket. An upper fastening part 132 comprises a hook 132.1 configured for mounting to the socket. The hook 132.1 is formed in a geometrically corresponding way to a respective portion of the socket. The hook is preferably configured to enclose an outer rim or edge of a peripheral contour of the socket at least in a form-fitting way. By means of the hook 132.1, the fastening apparatus 130 may be fixed to the socket, even if the fastening apparatus 130 has not yet been fastened to the fastening portion. Thus, last but not least, the hook 132.1 facilitates assembly. The hook 132.1 can also facilitate a positioning of the fastening apparatus 132, for example, to fix the fastening apparatus 130 to the fastening portion 104.1. The hook 132.1 may also be formed as a clamp or as U-shaped profile, for example.

The further fastening apparatus 140 may be partitioned at a coupling 148 which improves mounting or facilitates any exchange at the site.

Figure 16:
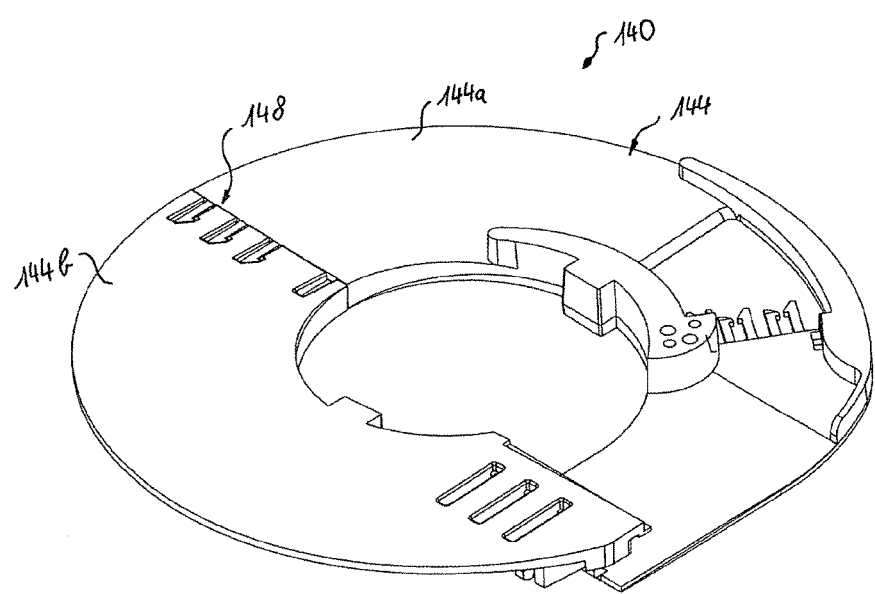

FIG. 16 shows first and second parts 144a, 144b of a lower fixing part 144 of the further fastening apparatus 140. The coupling 148 is formed between the two parts 144a, 144b as a plug coupling. The coupling 148 extends radially along the complete width of an annular portion of the lower fixing part 144 and partitions the lower fixing part 144 in two parts that extend over a pitch circle or along an arc of at least about 180°, respectively. Said partitioning in two halves allows for a simple (de)assembly and a good access independent of the relative rotational position of said lower fixing part 144 relative to the socket.

LIST OF REFERENCE NUMBERS 1 stand device, in particular, a ceiling stand device
3 first connection component, in particular, (hollow) spindle
3.1 fastening portion, in particular, groove
3.2 passage (spindle window)
3.3 outer lateral surface of spindle
4; 104 second connection component, in particular, socket
4.1; 104.1 fastening portion
104.1a bore or opening
104.1b abutting face carrier arm
5.1 cable duct or groove in carrier arm profile
6 cladding
7 rotary joint
10 movement-tolerant wiring arrangement
20 mounting apparatus
21 segment, in particular, single cable routing ring (winding)
21.1 longitudinal slot or opening
21.1a abutment edge or rim
22 segment portion being mountable in-between, in particular, pluggable portion
22.1 first (lower) half of segment
22.1a (plug-in) coupling portion for the other half
22.2 second (upper) half of segment
22.2a (plug-in) coupling portion for the other half
23 element or whirl, in particular, having a U-shaped cross-sectional profile (U-shaped profile), in particular, in a plugged-in state
23.1 side portion
23.1a lateral element portion
23.2 pin, in particular, with a T-shaped cross-sectional profile (T-shaped profile)
23.2a engagement means, in particular, an engagement hook that may be elastically biased
23.3 pin retainer
23.3a engagement means, in particular, step
24 connection portion between two adjacent elements
25 recess between two adjacent elements
26 (plug-in) coupling portion for a further segment portion or fastening apparatus
26.1 first coupling portion
26.2 second coupling portion
27 coupling part on mounting apparatus
27.1 first engagement means, in particular engagement hook which may be elastically biased
27.2 second engagement means, in particular, step
30; 130 fastening apparatus, in particular, for mounting the mounting apparatus to the socket
31; 131 fastening portion
131a abutting face
31.1; 131.1 fastening means, in particular through-bore
32; 132 upper fixing part
132.1 hook
34 lower fixing part
35 plug connection
35.1 pin retainer
35.2 pin
36 latch
36.1 abutment surface
37 coupling part on fastening apparatus
37.1 first engagement means, in particular, engagement hook which may be elastically biased
37.2 second engagement means, in particular, step
40; 140 further fastening apparatus, in particular, fixing apparatus for mounting the mounting apparatus to the spindle
41 securing portion
41.1 securing means, in particular, through-bore
42 upper fixing part
42.1 plane upper side
42.2 guiding edge or guiding trail 44; 144 lower fixing part
144a, 144b first and second components of the lower fixing part
44.1 tap or spring (rotational lock)
44.2 guiding edge or guiding trail
44.3 support surface, in particular, extending helically
44.4 passage extending radially inwards
44.5 wall
45 plug connection
45.1 pin retainer
45.2 pin
47 coupling part at a further fastening apparatus
47.1 first engagement means, in particular, engagement hook which may be elastically biased
47.2 second engagement means, in particular, step
50 insert (cover or lid)
50.2 guiding profile
51 engagement hook
52 plane upper side
53 radial partition
54 racket protruding radially inwards
60 insert, in particular, insert tray or insert partition
60.1 engagement hook
60.2 plane inner surface
70 line, in particular, cable
148 coupling
dK outer diameter of the mounting apparatus
dK20 (maximum) outer diameter of the mounting apparatus
D axis of rotation, in particular, vertically aligned vertical axis
K defined movement area, in particular, ring cavity
KL line duct
L longitudinal axis of the mounting apparatus
rK radial width of support surface
R36 curvature radius of latch The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A movement-tolerant wiring arrangement for a stand device configured for arrangement in an operating room, the wiring arrangement comprising:
   two connection components, one of the two connection components comprising a socket of the stand device, and the other connection component comprising a spindle;
   a mounting apparatus for movement-tolerant mounting of at least one line about an axis of rotation between the two connection components that are displaceable relative to one another; and
   a first fastening apparatus for arranging the at least one line relative to one of the two connection components at the one of the two connection components comprising the socket of the stand device;
   wherein the mounting apparatus is fixable to the first fastening apparatus and is configured for movement-tolerant guidance of a first portion of the at least one line about the axis of rotation and a second portion of the at least one line in a direction at least approximately parallel to the axis of rotation, the second portion of the at least one line passing through the spindle, such that the at least one line is guided along a defined path.

2. The wiring arrangement according to claim 1, wherein the mounting apparatus is elastically deformable, and wherein the mounting apparatus is variable in diameter.

3. The wiring arrangement according to claim 1, wherein the mounting apparatus includes recesses being arranged in sections along a longitudinal axis of the mounting apparatus and which recesses extend orthogonal to the longitudinal axis in a radial direction.

4. The wiring arrangement according to claim 1, wherein the mounting apparatus is configured as a linked chain via whirls that are movable relative to one another by at least one connection portion positioned between the whirls, the whirls comprising a U-shaped cross-sectional profile with three side portions, one of the three side portions including at least one lateral portion protruding on one or both free ends of the U-shaped cross-sectional profile in an axial direction.

5. The wiring arrangement according to claim 1, where the mounting apparatus is configured in modules and is formed by a plurality of identical segments, and wherein each respective segment constitutes a winding.

6. The wiring arrangement according to claim 1, wherein the mounting apparatus comprises at least one segment portion, the at least one segment portion including a coupling portion which is sized and shaped to be coupleable in a peripheral direction to at least one of the first fastening apparatus or an adjoining segment portion.

7. The wiring arrangement according to claim 1, wherein the mounting apparatus is helically arranged or arrangeable via a plurality of helical windings or segments.

8. The wiring arrangement according to claim 1, wherein the mounting apparatus and the first fastening apparatus each include a coupling part that is formed to include a geometrically complementary element, such that the complementary element of the coupling part of the mounting apparatus is pluggable to the complementary element of the coupling part of the fastening apparatus in a peripheral direction.

9. The wiring arrangement according to claim 1, wherein the wiring arrangement comprises a second fastening apparatus, the second fastening apparatus sized and shaped to be fixedly positioned at a fastening portion on the spindle, and wherein the second fastening apparatus is fixed to the mounting apparatus by a plug connection.

10. The wiring arrangement according to claim 1, wherein the wiring arrangement is configured modularly and is formed by an assembly of the two connection components, the mounting apparatus, the first fastening apparatus, and a second fastening apparatus that are coupleable by respective pluggable connections.

11. The wiring arrangement according to claim 1, wherein at least the mounting apparatus and/or the first fastening apparatus are made of a synthetic material.

12. A rotary joint comprising the movement-tolerant wiring arrangement according to claim 1.

13. A device for arrangement in an operating room, comprising:

two connection components, one of the two connection components comprising a socket and the other of the two connection components comprising a spindle;
a mounting apparatus for movement-tolerant mounting of at least one line about an axis of rotation between the two connection components, such that the two connection components are displaceable relative to one another;
a first fastening apparatus being attached to a fastening portion of the socket in a predefined relative position to arrange the mounting apparatus fixedly relative to the socket; and
a second fastening apparatus arrangeable at a fastening portion of the spindle in a predefined relative position in an at least non-rotatable manner for arranging the mounting apparatus fixedly relative to the spindle; wherein:
the mounting apparatus is configured to guide the at least one line about the axis of rotation;
the mounting apparatus is deformable elastically and is variable in diameter;
the mounting apparatus is configured in modules and is formed by a plurality of identical segments; and
the mounting apparatus is positioned helically about the axis of rotation and is positioned displaceably within a cavity formed by the socket and at least one of the first and second fastening apparatuses.

14. A stand device for arrangement in an operating room and for displacing a position of a medical device in the operating room, the stand device comprising:
a first connection component adapted as a spindle;
a second connection component adapted as a socket;
a mounting apparatus for movement-tolerant mounting of at least one line about an axis of rotation between the first and second connection components that are displaceable relative to one another; and
a first fastening apparatus for arranging the at least one line relative to one of the first and second connection components; wherein:
the mounting apparatus is fixable to the first fastening apparatus and is configured for movement-tolerant guidance of a first portion of the at least one line about the axis of rotation and a second portion of the at least one line in a direction at least approximately parallel to the axis of rotation, the second portion of the at least one line passing through the spindle, such that the at least one line is guided along a defined path; and
the mounting apparatus is mounted around the spindle which allows for the mounting apparatus to have varying diameters.

15. A movement-tolerant wiring arrangement on a stand device configured for arrangement in an operating room, the movement-tolerant wiring arrangement comprising:
two connection components, one of the two connection components comprising a socket of the stand device and another of the connection components comprising a spindle;
a mounting apparatus for movement-tolerant mounting of at least one line about an axis of rotation between the two connection components that are displaceable relative to one another; and
a first fastening apparatus for arranging the at least one line relative to one of the two connection components at the one of the two connection components comprising the socket of the stand device; wherein:
the mounting apparatus is fixable to the first fastening apparatus and is configured for movement-tolerant guidance of a first portion of the at least one line about the axis of rotation and a second portion of the at least one line in a direction at least approximately parallel to the axis of rotation, the second portion of the at least one line passing through the spindle, such that the at least one line is guided along a defined path;
the mounting apparatus is configured to have varying diameters between two fastening points; and
the mounting apparatus is guided around the axis of rotation in the socket.

* * * * *